United States Patent
Shimizu et al.

(10) Patent No.: US 8,675,735 B2
(45) Date of Patent: *Mar. 18, 2014

(54) PREDICTED REFERENCE INFORMATION GENERATING METHOD, VIDEO ENCODING AND DECODING METHODS, APPARATUSES THEREFOR, PROGRAMS THEREFOR, AND STORAGE MEDIA WHICH STORE THE PROGRAMS

(71) Applicant: Nippon Telegraph and Telephone Corporation, Tokyo (JP)

(72) Inventors: Shinya Shimizu, Yokosuka (JP); Kazuto Kamikura, Yokosuka (JP); Yoshiyuki Yashima, Yokosuka (JP); Hideaki Kimata, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/711,904

(22) Filed: Dec. 12, 2012

(65) Prior Publication Data

US 2013/0101038 A1   Apr. 25, 2013

Related U.S. Application Data

(62) Division of application No. 12/445,047, filed as application No. PCT/JP2007/070636 on Oct. 23, 2007, now Pat. No. 8,355,438.

(30) Foreign Application Priority Data

Oct. 30, 2006 (JP) ................. 2006-293929

(51) Int. Cl.
- *H04N 7/12* (2006.01)
- *H04N 11/02* (2006.01)
- *H04N 11/04* (2006.01)

(52) U.S. Cl.
USPC ................. 375/240.12; 375/240.16

(58) Field of Classification Search
USPC .......................................... 375/240.12
See application file for complete search history.

(56) References Cited

U.S. PATENT DOCUMENTS 5,619,281 A   4/1997 Jung
(Continued)

FOREIGN PATENT DOCUMENTS

CN   1127969 A   7/1996
(Continued)

OTHER PUBLICATIONS

ITU-T Rec. H.264/ISO/IEC 11496-10, "Editor's Proposed Draft Text Modifications for Joint Video Specification (ITU-T Rec. H.264/ISO/IEC 14496-10 AVC), Draft 7", Final Committee Draft, Document JVT-E022, pp. 63-64 and 117-121, Sep. 2002.

(Continued)

*Primary Examiner* — Christopher S Kelley
*Assistant Examiner* — Hee-Yong Kim
(74) *Attorney, Agent, or Firm* — Harness, Dickey & Pierce, P.L.C.

(57) ABSTRACT

When video images are processed by applying temporal or spatial interframe prediction encoding to each divided area, and generating a predicted image of a processing target area based on a reference frame of the processing target area and reference information which indicates a predicted target position of the processing target area in the reference frame, predicted reference information is generated as predicted information of the reference information. Reference information used when an area adjacent to the processing target area was processed is determined as predicted reference information prediction data used for predicting the reference information of the processing target area. Reference area reference information is generated using one or more pieces of reference information used when a reference area indicated by the prediction data was processed. The predicted reference information prediction data is updated using the reference area reference information. The predicted reference information is generated using one or more pieces of the updated predicted reference information prediction data.

15 Claims, 25 Drawing Sheets

(56) References Cited

U.S. PATENT DOCUMENTS

| | | |
|---|---|---|
| 6,430,224 B1 | 8/2002 | Naito et al. |
| 2003/0190079 A1 | 10/2003 | Penain et al. |
| 2004/0013309 A1 | 1/2004 | Choi et al. |
| 2004/0047418 A1 | 3/2004 | Tourapis et al. |
| 2004/0223548 A1 | 11/2004 | Kato et al. |
| 2005/0031035 A1 | 2/2005 | Vedula et al. |
| 2007/0189396 A1 | 8/2007 | Kitahara et al. |

FOREIGN PATENT DOCUMENTS

| | | |
|---|---|---|
| CN | 1497981 A | 5/2004 |
| CN | 1592421 A | 3/2005 |
| CN | 1910931 A | 2/2007 |
| EP | 720383 A1 | 7/1996 |
| EP | 1389017 A2 | 2/2004 |
| EP | 1482742 A2 | 12/2004 |
| EP | 1 596 609 A2 | 11/2005 |
| EP | 1835747 A1 | 9/2007 |
| JP | 8-205164 A | 8/1996 |
| JP | 10-136374 A | 5/1998 |
| JP | 2003-009179 A | 1/2003 |
| JP | 2004-056823 A | 2/2004 |
| JP | 2004-336369 A | 11/2004 |
| KR | 2004-0007140 A | 1/2004 |
| RU | 2 209 527 C2 | 7/2003 |
| TW | 200623885 A | 7/2006 |
| TW | 200719694 A | 5/2007 |
| WO | WO-2006/073116 A1 | 7/2006 |

OTHER PUBLICATIONS

Tourapis, Alexis Michael, "Direct Prediction for Predictive (P) and Bidirectionally Predictive (B) Frames in Video Coding," JVT-C128, Joint Video Team (JVT) of ISO/IEC MPEG & ITU-T VCEG Meeting, pp. 1-11, May 2002.

Kato, Sadaatsu and Boon, Choong Seng, "Motion Vector Prediction for Multiple Reference Frame Video Coding Using Temporal Motion Vector Normalization", PCSJ 2004, Proceedings of the 19th Picture Coding Symposium of Japan, P-2.18, Nov. 2004.

Kimata, Hideaki and Kitahara, Masaki, "Preliminary Results on Multiple View Video Coding (3DAV)", document M10976 MPEG Redmond Meeting, Jul. 2004.

Kimata, Hideaki, et al., "System Design of Free Viewpoint Video Communication," IEEE Proceedings of the Fourth International Conference on Computer and Information Technology, 2004.

Merkle, P., et al., "Efficient Compression of Multi-view Video Exploiting Inter-view Dependencies Based on H.264/MPEG4-AVC," IEEE International Conference on Multimedia and Expo 2006, Toronto, Jul. 9-12, 2006, pp. 1717-1720.

Kitahara, Masaki, et al., "Multi-view Video Coding using View Interpolation and Reference Picture Selection," IEEE International Conference on Multimedia and Expo 2006, Toronto, Jul. 9-12, 2006, pp. 97-100.

Yang, Haitao, et al., "Regional Disparity Based Motion and Disparity Prediction for MVC," ITU Study Group 16—Video Coding Experts Group—ISO/IEC MPEG & ITU-T VCEG (ISO/IEC JTC1/SC29/WG11 and ITU-T SG16 Q.6), Doc. JVT-V071, 22nd Meeting: Marrakech, Morocco, Jan. 14, 2007.

"Survey of Algorithms used for Multi-view Video Coding (MVC)," International Organisation for Standardisation, Coding of Moving Pictures and Audio (ISO/IEC JTC1/SC29/WG11, MPEG2005/N6909), Hong Kong, China, Jan. 21, 2005.

Senoh, Taka, et al., "Disparity Vector Prediction CE Plan for MVC/CE4," International Organisation for Standardisation, Coding of Moving Pictures and Audio (ISO/IEC JTC1/SC29/WG11, M13166), Montreux, Switzerland, Apr. 2006.

Hsiao, Yi-Hon, et al., "Short/Long-term Motion Vector Prediction in Multi-frame Video Coding System," 2004 International Conference on Image Processing (ICIP '04), Singapore, Oct. 24, 2004, pp. 1449-1452.

International Search Report and Written Opinion of the International Searching Authority, Application No. PCT/JP2007/070636, Feb. 5, 2008.

Official Action, Russian Patent Application No. 2009114363, Nov. 6, 2009.

Decision on Grant, Russian Patent Application No. 2009114363, May 4, 2011.

Search Report, Taiwanese Patent Application No. 96140158, Jun. 28, 2011.

European Search Report, Patent Application No. 07830370.8, Oct. 1, 2010.

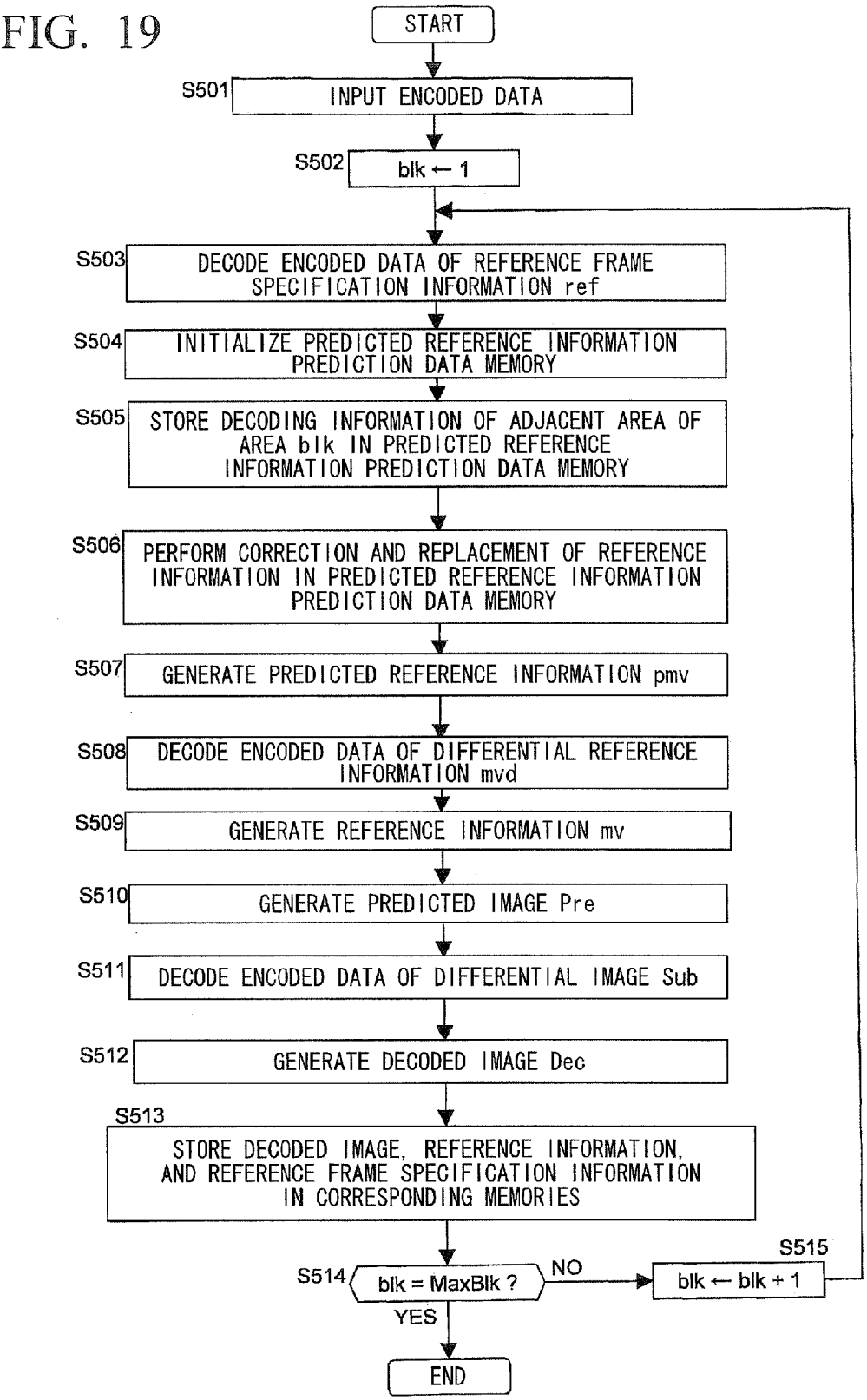

8x16

16x8

PREDICTED REFERENCE INFORMATION GENERATING METHOD, VIDEO ENCODING AND DECODING METHODS, APPARATUSES THEREFOR, PROGRAMS THEREFOR, AND STORAGE MEDIA WHICH STORE THE PROGRAMS

TECHNICAL FIELD

The present invention relates to a predicted reference information generating method and a corresponding apparatus used when (i) processing a video image by dividing an image into areas; applying a temporal or spatial interframe prediction encoding to each area of the divided image; and generating a predicted image of a processing target area based on a reference frame of the processing target area and reference information which indicates a predicted target position of the processing target area in the reference frame, and (ii) generating predicted reference information as predicted information of the relevant reference information. The present invention also relates to a video encoding method using the predicted reference information generating method and a corresponding apparatus; a video decoding apparatus for decoding encoded data generated by the video encoding method and a corresponding apparatus; a predicted reference information generating program for implementing the predicted reference information generating method and a computer-readable storage medium which stores the program; a video encoding program for implementing the video encoding method and a computer-readable storage medium which stores the program; and a video decoding program for implementing the video decoding method and a computer-readable storage medium which stores the program.

Priority is claimed on Japanese Patent Application No. 2006-293929, filed Oct. 30, 2006, the contents of which are incorporated herein by reference.

BACKGROUND ART

Multi-viewpoint video images are a plurality of video images obtained by photographing the same object and background thereof using a plurality of cameras. Below, a video image obtained by a single camera is called a "two-dimensional video image", and a set of multiple two-dimensional video images obtained by photographing the same object and background thereof is called a "multi-viewpoint video image".

There is a strong temporal correlation in the two-dimensional video image of each camera, which is included in a multi-viewpoint video image. In addition, when the cameras are synchronized with each other, the images (taken by the cameras) corresponding to the same time capture the object and background thereof in entirely the same state from different positions, so that there is a strong correlation between the cameras. The encoding efficiency of video encoding can be improved using this correlation.

First, conventional techniques relating to the encoding of two-dimensional video images will be shown.

In many known methods of encoding two-dimensional video images, such as MPEG-2 and H.264 (which are international video encoding standards), and the like, high encoding efficiency is obtained by means of interframe prediction encoding which uses a temporal correlation.

The interframe prediction encoding executed for encoding two-dimensional video images uses a temporal variation in a video image, that is, a motion. Therefore, the method used in the interframe prediction encoding is generally called "motion compensation". Accordingly, the interframe prediction encoding along a temporal axis is called "motion compensation", below. In addition, "frame" is an image which is a constituent of a video image and is obtained at a specific time.

Generally, two-dimensional video encoding has the following encoding modes for each frame: "I frame" encoded without using an interframe correlation, "P frame" encoded while performing motion compensation based on one already-encoded frame, and "B frame" encoded while performing motion compensation based on two already-encoded frames.

In order to further improve the efficiency of video image prediction, in H.263 and H.264, decoded images of a plurality of frames (i.e., two frames or more) are stored in a reference image memory, and a reference image is selected from the images of the memory to perform prediction.

The reference image can be selected for each block, and reference image specification information for specifying the reference image can be encoded to perform the corresponding decoding.

In motion compensation, in addition to the reference image specification information, a vector for indicating a position in the reference image is encoded, where a target block is encoded by using the position, and the vector is called a "motion vector".

In encoding of the motion vector in MPEG-4 or H.264, a predicted vector is generated using a motion vector of a block adjacent to an encoding target block, and only a differential vector between the predicted vector and the motion vector used in motion compensation applied to the target block. In accordance with this method, when motion continuity is present between the relevant adjacent blocks, the motion vector can be encoded with a high level of encoding efficiency.

Non-Patent Document 1 discloses in detail a process of generating a predicted vector in H. 264, and the general explanation thereof is presented below.

In H.264, as shown in FIG. 20A, based on motion vectors (mv_a, mv_b, and mv_c) used in a left side block (see "a" in FIG. 20A), an upper side block (see "b" in FIG. 20A), and an upper-right side block (see "c" in FIG. 20A) of an encoding target block, horizontal and vertical components are obtained by computing the median for each direction.

As H.264 employs a variable block size motion compensation, the block size for motion compensation may not be the same between the encoding target block and peripheral blocks thereof. In such a case, as shown in FIG. 20B, block "a" is set to the uppermost block among left side blocks adjacent to the target block, block "b" is set to the leftmost block among upper side blocks adjacent to the target block, and block "c" is set to the closest upper-left block.

As an exception, if the size of the target block is 8×16 pixels, as shown in FIG. 20C, instead of the median, block "a" and block "c" are respectively used for the left and right sides to perform prediction. Similarly, if the size of the target block is 16×8 pixels, as shown in FIG. 20D, instead of the median, block "a" and block "b" are respectively used for the lower and upper sides to perform prediction.

As described above, in H.264, a reference frame is selected for each block from among a plurality of already-encoded frames, and is used for motion compensation.

Generally, the motion of the imaged object is not uniform and depends on the reference frame. Therefore, in comparison with a motion vector in motion compensation using a reference frame different from that of the encoding target block, a motion vector in motion compensation using the same reference frame as the target block should be closer to a motion vector used for the target block.

Therefore, in H.264, if there is only one block (among the blocks a, b, and c) whose reference frame is the same as that of the encoding target block, then instead of the median, the motion vector of the relevant block is used as a predicted vector so as to generate a predicted vector having a relatively higher level of reliability.

When there is motion continuity through a plurality of frames, for example, when an object performs a linear uniform motion, a method for encoding a motion vector with a high level of encoding efficiency is known, in which a motion vector of each frame immediately before in the encoding order is accumulated, and information of the motion vector is subjected to scaling in accordance with the relevant time interval, so as to compute a motion vector.

In order to detect the time interval, output time of each frame is used as information.

Generally, such time information is encoded for each frame because the time information is necessary when, for example, the input order and the encoding order of the taken images differ from each other, and the images are decoded in the order of the imaging time. That is, on the encoder side, each frame is encoded while setting time information assigned to each input image in accordance with the input order, and on the decoder side, the decoded image of each frame is output in the order designated by the set time information.

In H.264, a so-called "temporal direct mode" is a method for encoding a motion vector with a high level of encoding efficiency, by using motion continuity through a plurality of frames.

For example, for frames A, B, and C shown in FIG. 21, it is assumed here that frames A, C, and B are sequentially encoded in this order, and frame C has been encoded using frame A as a reference frame so as to perform motion compensation. In such a state, in the temporal direct mode, the motion vector of a block in frame B is computed as explained below.

First, a motion vector mv, that is used on a block which belongs to frame C and is at the same position as an encoding target block, is detected.

Next, in accordance with the following formulas, a motion vector fmv when regarding frame A as a reference frame and a motion vector bmv when regarding frame C as a reference frame are computed.

$$fmv = (mv \times T_{AB})/T_{AC}$$

$$bmv = (mv \times T_{BC})/T_{BC}$$

where $T_{AB}$, $T_{BC}$, and $T_{AC}$ are respectively the time interval between frames A and B, the time interval between frames B and C, and the time interval between frames A and C.

In H.264, the temporal direct mode can be used only for "B frame" (Bi-predictive frame) which uses two reference frames for each block.

Non-Patent Document 2 shown later employs an application of the above mode so that also in P frame that uses only one reference frame for each block, the motion vector can be efficiently encoded.

Additionally, Non-Patent Document 3 discloses a method for efficiently encoding the motion vector by assuming both the motion continuity between adjacent blocks and the motion continuity thorough a plurality of frames.

FIGS. 22A to 22D show the general concept thereof. In this method, similar to H.264 and MPEG-4, a predicted vector is generated using a motion vector of a peripheral block around an encoding target block, and only the differential vector between the predicted vector and a motion vector that is used in actual motion compensation is encoded (see FIG. 22A).

In contrast with H.264, etc., the motion vector of a peripheral block is not directly used, but used after subjecting the motion vector to scaling in accordance with the relevant time interval, by using the following formula.

$$mv\_k' = mv\_k \times T_{ct}/T_{ck}$$

where mv_k is an original motion vector, mv_k' is a motion vector after the scaling, $T_{ct}$ is the time interval between the encoding target frame and a frame to be referred to by the encoding target block, and $T_{ck}$ is the time interval between the encoding target frame and a frame referred to by a peripheral block of the target block (see FIGS. 22B to 22D).

Below, conventional encoding methods for multi-viewpoint video images will be explained.

Generally, multi-viewpoint video encoding uses a correlation between cameras, and a high level of encoding efficiency is obtained by using "disparity compensation" in which motion compensation is applied to frames which are obtained at the same time by using different cameras.

For example, MPEG-2 Multiview profile or Non-Patent Document 4 employ such a method.

In the method disclosed in Non-Patent Document 4, any one of motion compensation and disparity compensation is selected for each block. That is, one having a higher encoding efficiency is selected for each block, so that both the temporal correlation and the inter-camera correlation can be used. In comparison with a case of using only one type of correlation, a higher encoding efficiency is obtained.

In disparity compensation, in addition to a prediction residual, a disparity vector is also encoded. The disparity vector corresponds to the motion vector for indicating a temporal variation between frames, and indicates a difference between positions on image planes, which are obtained by cameras arranged at different positions, and onto which a single position on the imaged object is projected.

FIG. 23 is a schematic view showing the concept of disparity generated between such cameras. In the schematic view of FIG. 23, image planes of cameras, whose optical axes are parallel to each other, are observed vertically from the upper side thereof.

In the encoding of the disparity vector, similar to the encoding of the motion vector, it is possible that a predicted vector is generated using a disparity vector of a block adjacent to the encoding target block, and only a differential vector between the predicted vector and the disparity vector used in disparity compensation applied to the target block is encoded. In accordance with such a method, when there is disparity continuity between the relevant adjacent blocks, the disparity vector can be encoded with a high level of encoding efficiency.

Non-Patent Document 1: ITU-T Rec.H.264/ISO/IEC 11496-10, "Editor's Proposed Draft Text Modifications for Joint Video Specification (ITU-T Rec. H.264/ISO/IEC 14496-10AVC), Draft 7", Final Committee Draft, Document JVT-E022, pp. 63-64, and 117-121, September 2002.

Non-Patent Document 2: Alexis Michael Tourapis, "Direct Prediction for Predictive(P) and Bidirectionally Predictive (B) frames in Video Coding," JVT-C128, Joint Video Team (JVT) of ISO/IEC MPEG&ITU-T VCEG Meeting, pp. 1-11, May, 2002.

Non-Patent Document 3: Sadaatsu Kato and Choong Seng Boon, "Motion Vector Prediction for Multiple Reference Frame Video Coding Using Temporal Motion Vector Normalization", PCSJ2004, Proceedings of the 19th Picture Coding Symposium of Japan, P-2.18, November 2004.

Non-Patent Document 4: Hideaki Kimata and Masaki Kitahara, "Preliminary results on multiple view video coding (3DAV)", document M10976 MPEG Redmond Meeting, July, 2004.

DISCLOSURE OF INVENTION

Problem to be Solved by the Invention

The conventional methods, in which the motion vector or disparity vector, which is actually used in the encoding target block, is encoded using the difference from a predicted vector generated using a motion vector or disparity vector used in an adjacent block, are based on a fact that the imaged object has continuity in the real space, and the probability that the motion of the imaged object itself does not change considerably is high. Therefore, the motion vector or disparity vector used in the target block can be encoded with a reduced amount of code.

However, if a reference frame, which is most suitable for predicting the image of the target block, is not used in the relevant adjacent block, the difference between the predicted vector and the actually-used motion vector increases, and the amount of code cannot be sufficiently reduced.

In particular, when performing encoding by adaptively selecting the motion compensation or the disparity compensation for each block, it is impossible to generate a predicted vector of the disparity vector from the motion vector, or to generate a predicted vector of the motion vector from the disparity vector because the motion vector and the disparity vector have considerably different characteristics. Therefore, it is impossible to efficiently encode information for interframe prediction.

For the motion vector, even when a reference frame at a time which is most suitable for predicting the image of the encoding target block is not used in an adjacent block, an effective motion vector can be generated by using the temporal direct mode disclosed in Non-Patent Document 1 or the method as disclosed in Non-Patent Document 2 or Non-Patent Document 3.

However, in such methods, motion continuity through frames is assumed. Therefore, if an imaged object does not show a motion close to a linear uniform motion through a few frames, no efficient predicted vector can be generated.

Also for the disparity vector, when a reference frame taken with a camera most suitable for predicting the image of the encoding target block is not used for an adjacent block, an efficient disparity vector can be generated by a method which can be easily analogized, and in which a disparity vector used in an adjacent block is subjected to scaling using the interval between the relevant cameras instead of the time interval.

In such a method, although an appropriate predicted vector can be generated when the camera directions are parallel (i.e., having parallel optical axes), no appropriate predicted vector can be generated under the other conditions.

Additionally, as a matter of course, even when employing such a method which uses an already-encoded motion vector or disparity vector by means of scaling using the time interval or the inter-camera interval, it is difficult to generate an appropriate predicted vector if one of motion compensation and disparity compensation is adaptively selected for each block. Accordingly, no efficient encoding can be implemented.

In light of the above circumstances, an object of the present invention is to provide a novel technique for generating a predicted vector or predicted disparity information, which does not considerably differ from a predicted vector or disparity information used in image prediction during encoding, even when an actual or apparent motion of an imaged object or a camera is not a linear uniform motion through a plurality of frames.

Means for Solving the Problem (1) Predicted Reference Information Generating Apparatus of the Present Invention In order to achieve the above object, a predicted reference information generating apparatus in accordance with the present invention is provided so as to process a video image by dividing an image into areas; applying a temporal or spatial interframe prediction encoding to each area of the divided image; and generating a predicted image of a processing target area based on a reference frame of the processing target area and reference information which indicates a predicted target position of the processing target area in the reference frame, and to generate predicted reference information as predicted information of the relevant reference information. The predicted reference information generating apparatus includes:

(a) a predicted reference information prediction data setting device for setting reference information, which was used when processing an area adjacent to the processing target area, as predicted reference information prediction data used for predicting reference information of the processing target area;

(b) a reference area reference information generating device for generating reference area reference information based on one or more pieces of reference information used when processing a reference area indicated by the predicted reference information prediction data;

(c) a predicted reference information prediction data updating device for updating the predicted reference information prediction data by using the generated reference area reference information; and (d) a predicted reference information generating device for generating the predicted reference information by using one or more pieces of the updated predicted reference information prediction data.

The above devices can also be implemented by a computer program. Such a computer program may be provided by storing it in an appropriate computer-readable storage medium, or by means of a network, and can be installed and operate on a control device such as a CPU so as to implement the present invention.

In the predicted reference information generating apparatus having the above structure, first, reference information, which was used when processing an area adjacent to the processing target area, is set as predicted reference information prediction data used for predicting reference information of the processing target area.

Next, reference area reference information is generated based on one or more pieces of reference information used when processing a reference area indicated by the predicted reference information prediction data, and the set predicted reference information prediction data is updated by using the generated reference area reference information.

Next, predicted reference information as predicted information of reference information for the processing target area is generated by using one or more pieces of the updated predicted reference information prediction data Therefore, in the predicted reference information generating apparatus in accordance with the present invention, the predicted reference information as the predicted information of reference information for the processing target area is not generated by directly using the reference information when an adjacent area of the processing target area was processed. Instead, in consideration of a non-linear motion of an imaged object or a non-uniform motion of a camera, the relevant processing includes setting the reference information, used when the adjacent area of the processing target area was processed, as predicted reference information prediction data; generating reference area reference information based on one or more pieces of reference information used when processing a reference area indicated by the predicted reference information prediction data; updating the predicted reference information prediction data by using the generated reference area reference information; and generating the predicted reference information as the predicted information of reference information for the processing target area by using the updated predicted reference information prediction data.

In the above processing, the process of updating the predicted reference information prediction data may be repeated using the updated predicted reference information prediction data. In such a case, the relevant process may be repeated until the reference frame of the processing target frame is obtained.

In the predicted reference information generating apparatus in accordance with the present invention, even when there is no temporal continuity of video image variation through a plurality of frames or when a multi-viewpoint image is encoded or decoded while selecting one of motion compensation and disparity compensation for each processing target area, difference between the predicted reference information and the reference information used when encoding or decoding the processing target area can be reduced, thereby efficiently encoding or decoding a motion vector or disparity information used in interframe prediction encoding.

(2) Video Encoding Method of the Present Invention

The predicted reference information generating method of the present invention, which can be implemented by the above predicted reference information generating apparatus of the present invention, may be applied to a video encoding method.

Therefore, the video encoding method of the present invention is used for encoding a video image by entirely dividing an image into areas; selecting, for each area of the divided image, an encoding target area reference frame from among a plurality of already-encoded frames, which is used as a reference frame when predicting image information of the area; generating a predicted image by using the encoding target area reference frame and reference information (e.g., a motion vector or a disparity vector) which indicates a predicted target position of an encoding target area in the encoding target area reference frame; and encoding differential information between the predicted image and the image of the encoding target area.

The video encoding method includes:
(a) a predicted reference information prediction data setting step of setting reference information, which was used when encoding an area adjacent to the encoding target area, as predicted reference information prediction data used for predicting reference information of the encoding target area;
(b) a reference area reference information generating step of generating reference area reference information based on one or more pieces of reference information used when encoding a reference area indicated by the predicted reference information prediction data;
(c) a predicted reference information prediction data updating step of updating the predicted reference information prediction data by using the generated reference area reference information;
(d) a predicted reference information generating step of generating predicted reference information, which functions as predicted information of the reference information of the encoding target area, by using one or more pieces of the updated predicted reference information prediction data, and
(e) a differential reference information encoding step of encoding differential information between the predicted reference information and reference information used when generating a predicted image of the encoding target area.

In a typical example, in the predicted reference information prediction data updating step, the predicted reference information prediction data is updated by changing corresponding-point information indicated by the predicted reference information prediction data to the sum of the corresponding-point information indicated by the predicted reference information prediction data and corresponding-point information indicated by the reference area reference information.

In another typical example, in the predicted reference information prediction data updating step, the predicted reference information prediction data is updated by changing corresponding-point information indicated by the predicted reference information prediction data to corresponding-point information indicated by the reference area reference information.

Preferably, in the predicted reference information prediction data updating step, the predicted reference information prediction data is updated by changing corresponding-point information indicated by the predicted reference information prediction data to any one of the sum of the corresponding-point information indicated by the predicted reference information prediction data and corresponding-point information indicated by the reference area reference information, and the corresponding-point information of the reference area reference information.

In this case, it is possible that in the predicted reference information prediction data updating step, it is determined whether the corresponding-point information of the predicted reference information prediction data is changed to the sum of the corresponding-point information of the predicted reference information prediction data and the corresponding-point information of the reference area reference information or to the corresponding-point information of the reference area reference information, based on time information and viewpoint information of the encoding target area reference frame, time information and viewpoint information of a frame which includes the reference area, time information and viewpoint information of a reference area reference frame which is a reference frame used when encoding the reference area, and time information and viewpoint information of an encoding target frame.

A preferable example further includes a predicted reference information geometric-conversion step of applying geometric conversion to corresponding-point information indicated by the predicted reference information prediction data by using a camera parameter at the viewpoint of an encoding target frame, a camera parameter at the viewpoint of the encoding target area reference frame, and a camera parameter at the viewpoint of a frame indicated by the predicted reference information prediction data.

Another preferable example further includes a predicted reference information geometric-conversion step of applying geometric conversion to corresponding-point information indicated by the reference area reference information by using a camera parameter at the viewpoint of an encoding target frame, a camera parameter at the viewpoint of the encoding target area reference frame, a camera parameter at the viewpoint of a frame indicated by the predicted reference information prediction data, and a camera parameter at the viewpoint of a frame indicated by the reference area reference information corresponding to the predicted reference information prediction data.

Another preferable example further includes a predicted reference information prediction data search step of searching a search target, which is an area in the reference frame of the encoding target area, for an area corresponding to the reference area indicated by the predicted reference information prediction data, and replacing the predicted reference information prediction data with corresponding information of the search result.

In the predicted reference information prediction data search step, a search may be performed in which the search center is set to an area indicated by the above corresponding information for the predicted reference information prediction data, and the predicted reference information prediction data may be replaced with information in accordance with the search result.

Another preferable example further includes a predicted reference information prediction data search step of searching a search target, which is an area in the reference frame of the encoding target area, for an area corresponding to the adjacent area of the encoding target area, and replacing the predicted reference information prediction data with corresponding information of the search result.

In the predicted reference information prediction data search step, a search may be performed in which the search center is set to an area indicated by the above corresponding information for the predicted reference information prediction data, and the predicted reference information prediction data may be replaced with information in accordance with the search result.

(3) Video Decoding Method of the Present Invention

The predicted reference information generating method of the present invention, which can be implemented by the above predicted reference information generating apparatus of the present invention, may be applied to a video decoding method.

Below, the video decoding method implemented by the predicted reference information generating method of the present invention will be explained.

Therefore, the video decoding method of the present invention is used for decoding an image by entirely dividing an image into areas and generating a predicted image by using a plurality of already-decoded frames, wherein a video image is decoded by decoding, for each area of the divided image, information for indicating a decoding target area reference frame which is an already-decoded frame used for generating the predicted image; reference information for indicating a predicted target position of a decoding target area in the decoding target area reference frame; and differential information between the predicted image and the image of the decoding target area. The video decoding method includes:
(a) a predicted reference information prediction data setting step of setting reference information, which was used when decoding an area adjacent to the decoding target area, as predicted reference information prediction data used for predicting reference information of the decoding target area;
(b) a reference area reference information generating step of generating reference area reference information based on one or more pieces of reference information used when decoding a reference area indicated by the predicted reference information prediction data;
(c) a predicted reference information prediction data updating step of updating the predicted reference information prediction data by using the generated reference area reference information;
(d) a predicted reference information generating step of generating predicted reference information, which functions as predicted information of the reference information of the decoding target area, by using one or more pieces of the updated predicted reference information prediction data, and
(e) a differential reference information decoding step of decoding, from encoded data, differential information between the predicted reference information and reference information used when generating a predicted image of the decoding target area.

In a typical example, in the predicted reference information prediction data updating step, the predicted reference information prediction data is updated by changing corresponding-point information indicated by the predicted reference information prediction data to the sum of the corresponding-point information indicated by the predicted reference information prediction data and corresponding-point information indicated by the reference area reference information.

In another typical example, in the predicted reference information prediction data updating step, the predicted reference information prediction data is updated by changing corresponding-point information indicated by the predicted reference information prediction data to corresponding-point information indicated by the reference area reference information.

Preferably, in the predicted reference information prediction data updating step, the predicted reference information prediction data is updated by changing corresponding-point information indicated by the predicted reference information prediction data to any one of the sum of the corresponding-point information indicated by the predicted reference information prediction data and corresponding-point information indicated by the reference area reference information, and the corresponding-point information indicated by the reference area reference information.

In this case, it is possible that in the predicted reference information prediction data updating step, it is determined whether the corresponding-point information of the predicted reference information prediction data is changed to the sum of the corresponding-point information of the predicted reference information prediction data and the corresponding-point information of the reference area reference information or to the corresponding-point information of the reference area reference information, based on time information and viewpoint information of the decoding target area reference frame, time information and viewpoint information of a frame which includes the reference area, time information and viewpoint information of a reference area reference frame which is a reference frame used when decoding the reference area, and time information and viewpoint information of a decoding target frame.

A preferable example further includes a predicted reference information geometric-conversion step of applying geometric conversion to corresponding-point information indicated by the predicted reference information prediction data by using a camera parameter at the viewpoint of a decoding target frame, a camera parameter at the viewpoint of the decoding target area reference frame, and a camera parameter at the viewpoint of a frame indicated by the predicted reference information prediction data.

Another preferable example further includes a predicted reference information geometric-conversion step of applying geometric conversion to corresponding-point information indicated by the reference area reference information by using a camera parameter at the viewpoint of a decoding target frame, a camera parameter at the viewpoint of the decoding target area reference frame, a camera parameter at the viewpoint of a frame indicated by the predicted reference information prediction data, and a camera parameter at the viewpoint of a frame indicated by the reference area reference information corresponding to the predicted reference information prediction data.

Another preferable example further includes a predicted reference information prediction data search step of searching a search target, which is an area in the reference frame of the decoding target area, for an area corresponding to the reference area indicated by the predicted reference information prediction data, and replacing the predicted reference information prediction data with corresponding information of the search result.

In the predicted reference information prediction data search step, a search may be performed in which the search center is set to an area indicated by the above corresponding information for the predicted reference information prediction data, and the predicted reference information prediction data may be replaced with information in accordance with the search result.

Another preferable example further includes a predicted reference information prediction data search step of searching a search target, which is an area in the reference frame of the decoding target area, for an area corresponding to the adjacent area of the decoding target area, and replacing the predicted reference information prediction data with corresponding information of the search result.

In the predicted reference information prediction data search step, a search may be performed in which the search center is set to an area indicated by the above corresponding information for the predicted reference information prediction data, and the predicted reference information prediction data may be replaced with information in accordance with the search result.

Effect of the Invention

In accordance with the present invention, reference information, which was used when encoding an area adjacent to the encoding target area, is converted by using encoded data, which was used when encoding the relevant reference area, into reference information suitable for time and viewpoint relationships between the encoding target frame and the encoding target reference frame, and predicted reference information is then generated. Accordingly, even when there is no temporal continuity of video image variation through a plurality of frames or when a multi-viewpoint image is encoded while selecting one of motion compensation and disparity compensation for each encoding unit area, no additional information which indicates the relevant conversion method is added, and difference between the predicted reference information and the reference information used when encoding the encoding target area can be reduced, thereby efficiently encoding a motion vector or disparity information used in interframe prediction encoding.

BRIEF DESCRIPTION OF THE DRAWINGS

FIG. 19 is an example of the flowchart of the video decoding process executed by the video decoding apparatus of the embodiment.

Figure 1:
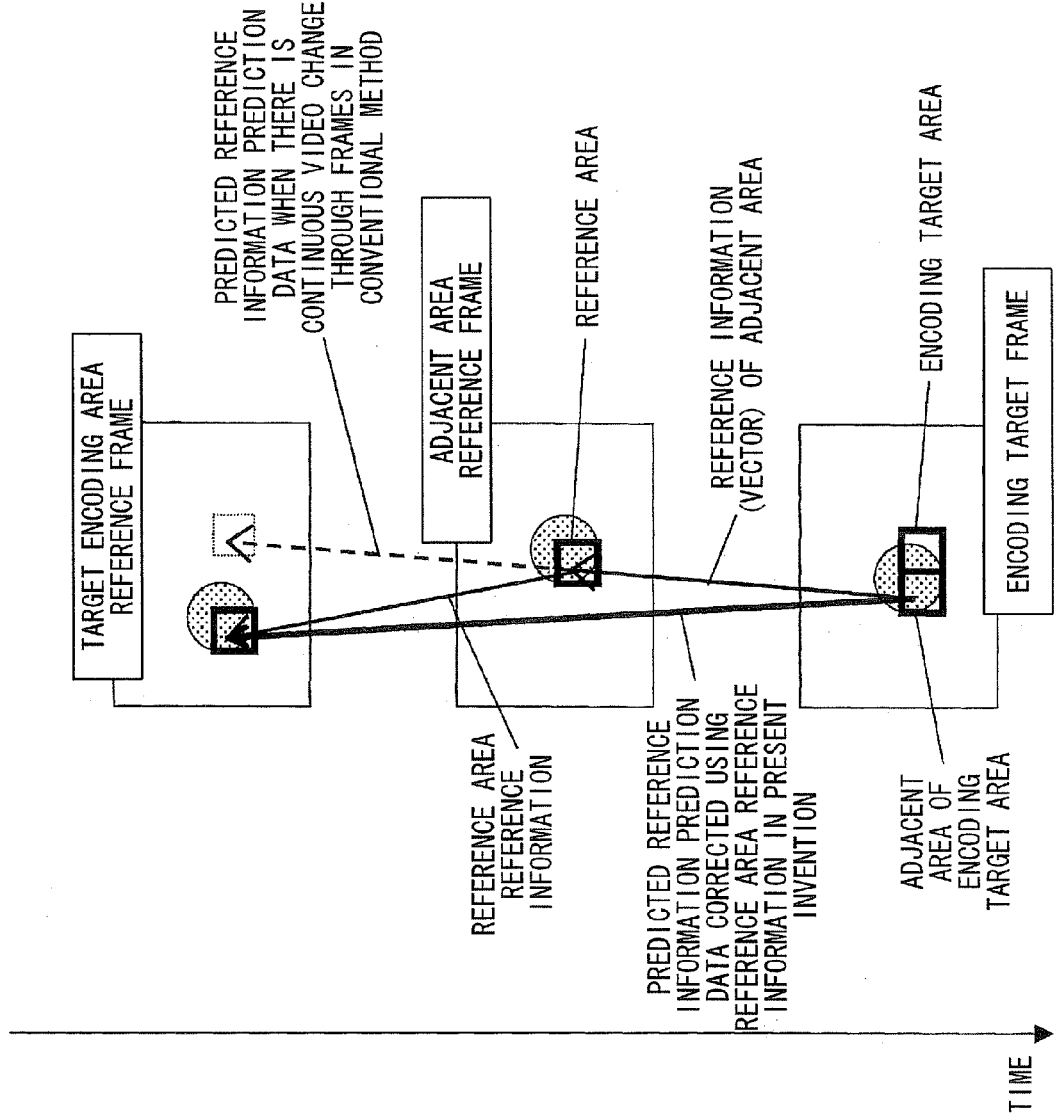
FIG. 1 is a schematic diagram showing an example of processing for replacing predicted reference information prediction data with the sum of the predicted reference information prediction data and reference area reference information, in accordance with the present invention.

REFERENCE SYMBOLS 100 video encoding apparatus
101 image input unit
102 block-matching implementation unit
103 predicted image generator
104 differential image encoder
105 differential image decoder
106 reference frame memory 106
107 reference information accumulation memory 107
108 predicted reference information prediction data memory 108
109 predicted reference information generator 109
110 differential reference information encoder
111 reference information updater
112 reference frame specification information accumulation memory
113 reference frame selector
114 reference frame specification information encoder

BEST MODE FOR CARRYING OUT THE INVENTION

According to the video encoding method or the video decoding method of the present invention, in predicting reference information used for encoding or decoding an encoding target area or a decoding target area by using reference information of an area that is adjacent to the encoding target area or the decoding target area, the reference information of the adjacent area is corrected using reference information, which was used when encoding or decoding the reference area which was referred to when encoding or decoding the adjacent area, so that even when there is no continuity in video change between a plurality of frames, accurately predicted reference information can be generated.

Since a conventional method, as indicated by the broken-line arrow in FIG. 1, simply corrects reference information (that is, generates predicted reference information from reference information) on the assumption that there is video change continuity across a plurality of frames, when video change is not continuous across a plurality of frames, erroneous conversions are made.

In contrast, in the present invention, the change from a reference frame of an adjacent area to another frame can be acquired from reference information when the reference information of the adjacent area was encoded or decoded, whereby the reference information of the adjacent area can be corrected without assuming that there is video change continuity across the plurality of frames.

Here, in the invention, reference information of an adjacent area, i.e. reference information when an area indicated by "predicted reference information prediction data" was encoded or decoded, is termed "reference area reference information".

This reference area reference information was actually used in encoding or decoding the reference area, and is regarded as reliably expressing change in the video image due to its superior encoding efficiency. Information corrected using such information is also regarded as reliably expressing video change.

In one method of correcting reference information, as shown in FIG. 1, reference area reference information may be added to reference information relating to an adjacent area (i.e., vector synthesis method).

In this method, the video change from a reference frame of a reference area of an adjacent area to a reference frame of an adjacent area is added to the video change from a reference frame of an adjacent area to an encoding or decoding target frame, thereby determining the video change from the reference frame of the reference area of the adjacent area to the encoding or decoding target frame.

Based on the fact that video change that is already encoded or decoded does not change, this method achieves a highly reliable reference information transform.

A case is conceivable where the reference area of the adjacent area is not a unit area of the encoding or decoding process, and contains a plurality of pieces of reference information; if so, one of the following methods can be used:

(i) Reference information used in a unit area of the encoding or decoding process that contains most of the reference area is set as the reference area reference information;

(ii) Average reference information, which is determined by allocating weights to reference information of the unit areas of the encoding or decoding process in accordance with the containment ratio of the reference area therein, is set as the reference area reference information; and (iii) All pixels contained in a unit area of the encoding or decoding process are made to hold the reference information to be encoded or decoded, and reference information that appears most often in a plurality of reference areas is set as the reference area reference information.

This correction can be performed not only once but also repeatedly, for example, by re-correcting reference information that was corrected.

By adding repeated corrections, when the reference frame of the reference area of the adjacent area is not sufficiently near to the encoding or decoding target area reference frame, it becomes possible to obtain predicted reference information prediction data that is nearer to the video change from the encoding or decoding target area reference frame.

Figure 2:
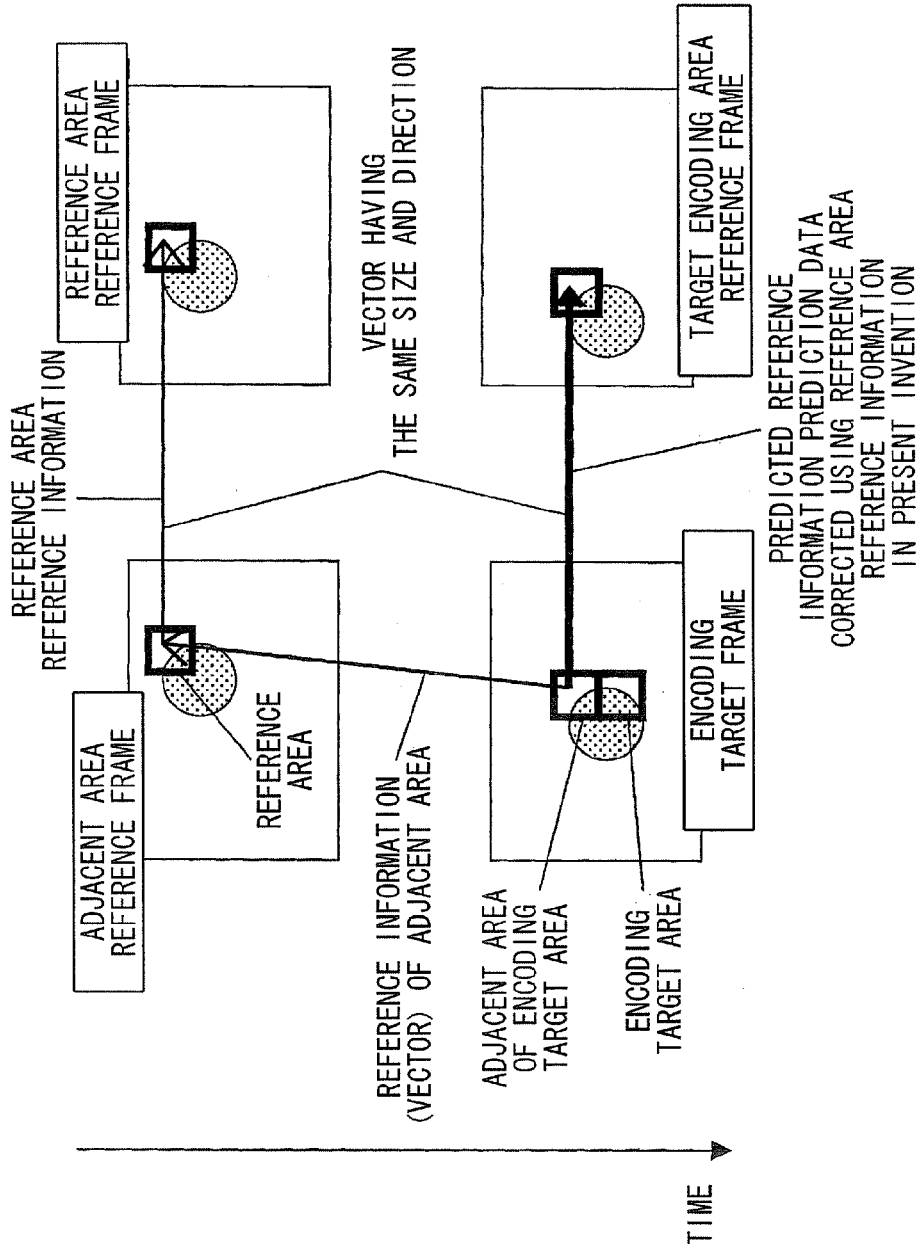
FIG. 2 is a schematic diagram showing an example of processing for replacing predicted reference information prediction data with reference area reference information, in accordance with the present invention.

Regarding the method of correcting the reference information, as shown in FIG. 2, reference information for the adjacent area can be switched with reference area reference information.

In this method, the video change from the encoding or decoding target area reference frame to the encoding or decoding target frame is determined by treating the video change from the reference frame of the adjacent area to the encoding or decoding target frame as being equal to video change from the reference frame of the adjacent area to the encoding or decoding target area reference frame.

This method utilizes two facts of the actual world.

The first is the fact that there are physical restrictions on the change of an imaged object. Physical restriction on the change of the imaged object indicates a high temporal correlation of disparity.

That is, disparity in areas given a correspondence relationship in different frames other over time, i.e. in an adjacent area and a reference area of that adjacent area, has remarkably high similarity.

Therefore, if temporal reference information of the adjacent area is switched with inter-camera reference information in a reference area of the adjacent area, the conversion to inter-camera reference information in the adjacent area can be achieved with high precision.

The second fact is that an imaged object has one motion in the actual world. The fact that the imaged object has only one motion indicates that the motion filmed by all cameras is the same, and that the motion of the imaged object has high inter-camera correlation.

That is, motions in areas given a correspondence relationship in frames that are filmed at the same time by different cameras, i.e. motions in an adjacent area and a reference area of that adjacent area, have remarkably high similarity.

Therefore, if inter-camera reference information of the adjacent area is switched with temporal reference information in a reference area of the adjacent area, the conversion to temporal reference information in the adjacent area can be achieved with high precision.

Thus, even if the reference target differs in the time direction and the camera direction in the encoding target area and its adjacent areas, reference information can be predicted precisely.

In this method, the greater the conformity of the time relationship and viewpoint relationship between the reference area of the adjacent area and its reference frame to the time relationship and viewpoint relationship between the encoding or decoding target frame and the encoding or decoding target area reference frame, the more accurate is the prediction achieved in the conversion.

To correct the reference information, in each encoding or decoding target area, one method can be selected as appropriate from those described above.

Since the characteristic of the image used in each method is different, whichever method is appropriate will vary depending on the circumstances.

Therefore, switching the method for each encoding or decoding target area ensures that correction appropriate for that area can be added, and that predicted reference information that more accurately expresses video change can be generated.

Here, since the former method accumulates temporal change in the video image between frames, it is appropriate for predicting video change in the time direction, whereas the latter method is appropriate for converting the dimension of inter-camera and time of video change, the determination of which method is preferable can be made from the image prediction method used in the encoding or decoding target area, or the dimension of video change indicated by predicted reference information prediction data and reference area reference information.

That is, the appropriate method can be precisely determined by using the time information and viewpoint information of the encoding or decoding target area reference frame, the time information and viewpoint information of the frame which contains the relevant reference area, the time information and viewpoint information of the reference area reference frame which is a reference frame used when encoding or decoding the reference area, and the time information and viewpoint information of an encoding or decoding target frame.

The reference information can be corrected by geometrically converting the reference information in compliance with camera parameters of the viewpoint of the encoding or decoding target frame, camera parameters of the viewpoint of the encoding or decoding target area reference frame, and camera parameters of the viewpoint of the frame which contains the reference area.

This conversion method can be performed to predicted reference information prediction data and reference area reference information.

According to these methods, video change of frames taken by two cameras can be converted to video change of frames taken by another combination of two cameras.

Unlike the temporal change of a video image, inter-camera change of the video image arises from the positions of the cameras and the imaged object; therefore, when images are taken from two different positions at the same time, and camera parameters indicating the positional relationship of the cameras and the like are known beforehand, it is possible to precisely predict an image taken from yet another position.

Since this correspondence relationship cannot be obtained merely by performing scaling in accordance with the camera interval, conversion that allows an accurate prediction cannot be achieved simply by expanding a conventional scaling method in accordance with a time interval.

As a method of correcting the reference information, an area on the reference frame of the encoding or decoding target area can be deemed a search target, an area that is arranged in correspondence with the reference area specified by the predicted reference information prediction data is searched, and the predicted reference information prediction data is replaced with corresponding information of the search result.

In another method of correcting the reference information, an area on the reference frame of the encoding target area is set as a search target, an area that is arranged in correspondence with an adjacent area of the encoding target area is searched, and the predicted reference information prediction data can then be replaced with corresponding information of the search result.

Although these methods require considerable arithmetic operations on both the encoding side and the decoding side, they can more accurately determine a correspondence point on the encoding or decoding target area reference frame of the adjacent area, and can generate predicted reference information that more accurately expresses video change, thereby efficiently encoding the reference information.

Whether these methods can accurately determine the correspondence point largely depends on the search method and search range when searching the corresponding area, i.e. the arithmetic cost.

However, when the reference frame of the predicted reference information prediction data is nearer the encoding or decoding target area reference frame than the encoding or decoding target frame, since the reference information of the predicted reference information prediction data expresses motion to a midway point, it is sufficient to search for change after that point, and arithmetic cost can be reduced.

The present invention will be explained in detail based on exemplary embodiments.

Figure 3:
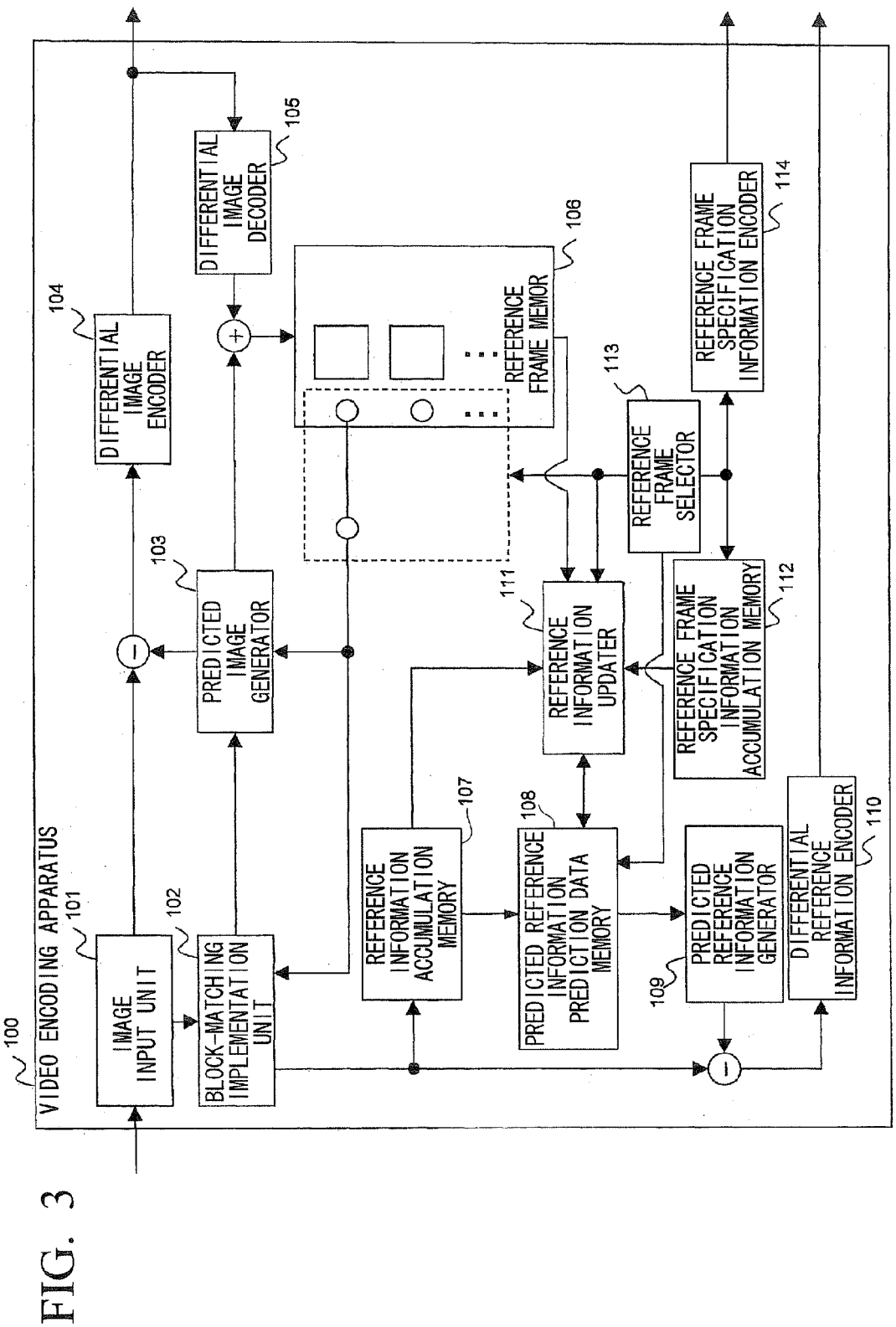
FIG. 3 shows an embodiment of the video encoding apparatus of the present invention.

FIG. 3 is an embodiment of a video encoding apparatus 100 of the present invention.

The video encoding apparatus 100 includes an image input unit 101 into which an image as an encoding target is input, a block-matching implementation unit 102 that performs block-matching to determine a corresponding area in a reference frame that has already been encoded, in each area of a divided encoding target image, a predicted image generator 103 that generates a predicted image of an image in an encoding target area using the block-matching result and a reference frame, a differential image encoder 104 that encodes a differential image between an image in the encoding target area and the predicted image, a differential image decoder 105 that decodes differential image encoded data, a reference frame memory 106 that accumulates a decoded image of an image in an encoding target area generated by the sum of the decoded differential image and the predicted image as a reference frame, a reference information accumulation memory 107 that accumulates reference information relating to the block-matching result used when generating the predicted image, a predicted reference information prediction data memory 108 that accumulates reference information that becomes a candidate for predicted reference information used in encoding the reference information relating to the block-matching result used when generating the predicted image, a predicted reference information generator 109 that generates predicted reference information from the predicted reference information prediction data, a differential reference information encoder 110 that encodes the difference between the reference information relating to the block-matching result used when generating the predicted image and the predicted reference information, a reference information updater 111 that corrects the predicted reference information prediction data in the predicted reference information prediction data memory 108, a reference frame specification information accumulation memory 112 that accumulates information relating to a frame referred to by each already-encoded area, a reference frame selector 113 that selects a reference frame to be used when encoding an image in an encoding target area, and a reference frame specification information encoder 114 that encodes information for specifying the reference frame used when encoding the encoding target area.

Figure 4:
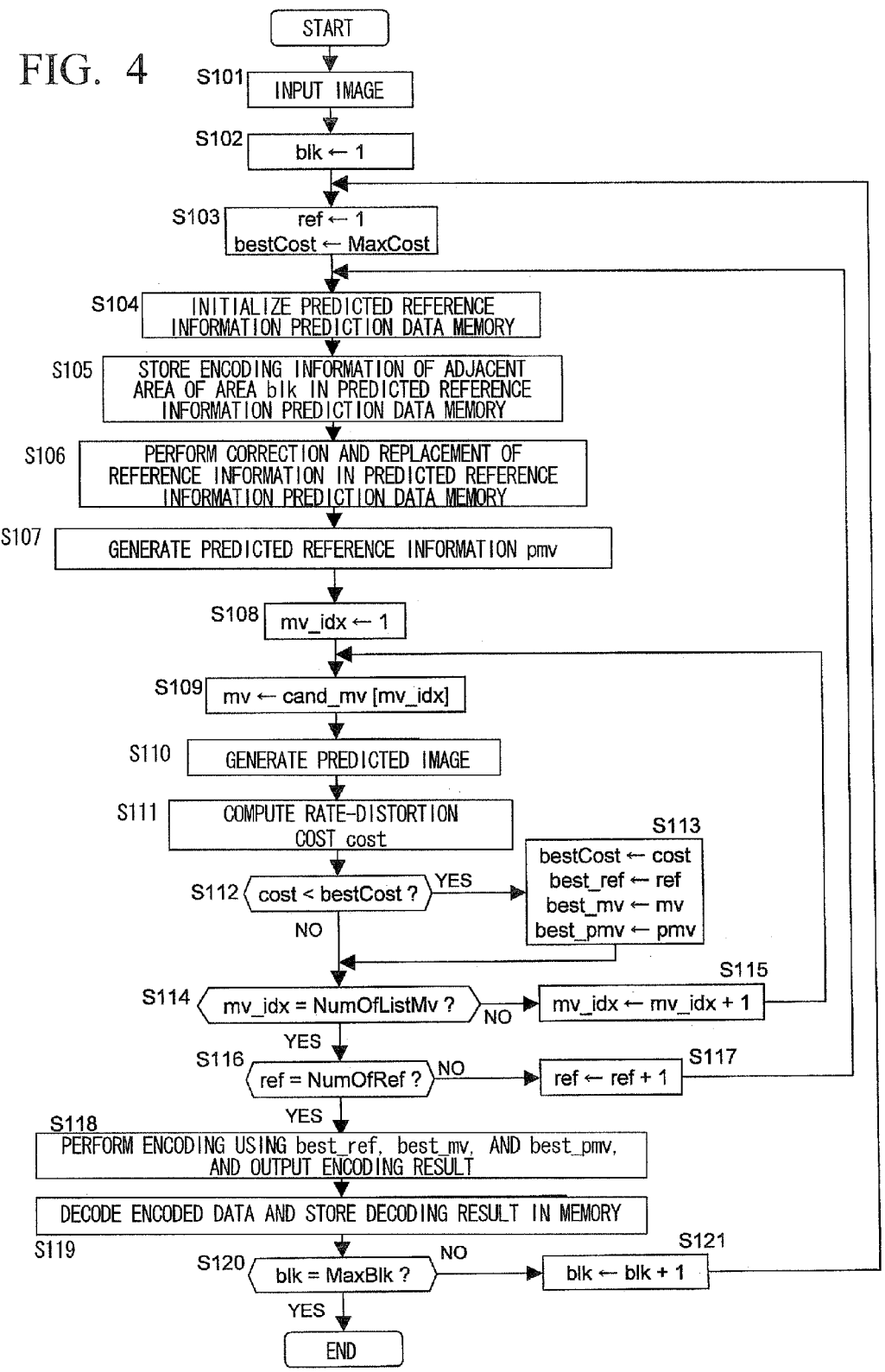
FIG. 4 is an example of the flowchart of the video encoding process executed by the video encoding apparatus of the embodiment.

FIG. 4 is a flowchart executed by the video encoding apparatus 100 having this configuration.

Processes executed by the video encoding apparatus 100 having this configuration will be explained in detail based on this flowchart.

In this example, images of a plurality of frames are already encoded, and the results are accumulated in the reference frame memory 106, the reference information accumulation memory 107, and the reference frame specification information accumulation memory 112.

Firstly, an image that will become an encoding target is input through the image input unit 101 (S101).

The input encoding target image is entirely divided into areas, and each area is encoded (S102-S121).

In this flowchart, blk indicates an index of a block (area), and MaxBlk indicates the total number of blocks for one image.

After initializing the index blk at 1 (S102), the following processes (S103 to S119) are executed repeatedly while incrementing blk by 1 (S121) until it reaches MaxBlk (S120).

In a process performed for each block, a reference frame best_ref, reference information best_mv, and predicted reference information best_pmv to be used for encoding that block are determined (S103 to S117), and this information for video prediction and image information of a block blk encoded using that information are encoded and output (S188). To execute subsequent encoding processes, the encoded data is decoded, and the decoded image information, best_ref, and best_mv are stored in the reference frame memory 106, the reference frame specification information accumulation memory 112, and the reference information accumulation memory 107 respectively (S119).

In the encoding process of S118, information indicating best_ref is encoded by the reference frame specification information encoder 114, while difference between best_mv and best_pmv is encoded by the differential reference information encoder 110, and the differential image encoder 104 encodes the differential image between the input image and a predicted image generated by the predicted image generator 103 using this information.

In the decoding process of S119, the differential image decoder 105 decodes the encoded data relating to the differential image, and decoded image information of the block blk is obtained by determining the sum of the decoded result and the predicted image generated by the predicted image generator 103.

Information for video prediction used in encoding is determined by repeatedly executing the following processes (S104 to S115) with respect to all usable reference frames.

After initializing a reference frame index ref at 1, and initializing a minimum rate-distortion cost bestCost at an absolutely unattainable maximum value MaxCost (S103), processes of generating predicted reference information (S104 to S107) and processes of determining reference information such as to minimize the rate-distortion cost (S108 to S115) are repeatedly executed while incrementing ref by 1 (S117) until it reaches the total number of usable reference frames NumOfRef (S116).

During the process of generating predicted reference information after initializing the predicted reference information prediction data memory 108 (S104), for a plurality of blocks adjacent to block blk, a combination of a reference frame number REF used when that block is encoded, reference information MV, and information POS indicating the position of that block (REF, MV, POS) is stored in the predicted reference information prediction data memory 108 (S105).

It is assumed that MV and REF accumulate respectively in the reference information accumulation memory 107 and the reference frame specification information accumulation memory 112 in correspondence with the block index or the position within the image.

When, for example, the areas of the divided image are encoded in a raster scan sequence, the plurality of blocks adjacent to the block blk can include blocks on the upper, left, and upper-right sides.

In this embodiment, reference information of the relevant three adjacent blocks is set as predicted reference information prediction data. Off-screen blocks are, however, excluded from the candidates.

Subsequently, the predicted reference information prediction data in the predicted reference information prediction data memory 108 is extracted, updated by the reference information updater 111, and accumulated again in the predicted reference information prediction data memory 108 (S106). This process will be explained in detail later.

Predicted reference information pmv is generated from the plurality of pieces of reference information accumulated in the predicted reference information prediction data memory 108 (S107). Specifically, the predicted reference information pmv is generated by determining an intermediate value of the predicted reference information prediction data for each reference information component.

That is, when the reference information is expressed as a two-dimensional vector along X-Y, for each component, an intermediate value is determined for the corresponding components belonging to a plurality of predicted reference information prediction data, and pmv for the relevant component is given this value.

Another reference can be used instead of an intermediate value, such as an average value, maximum value, minimum value, etc. However, the reference used must be the same as that used by the video decoding apparatus.

Using the pmv determined in this manner, a process is executed to determine reference information that will minimize the rate-distortion cost.

After initializing the reference information index mv_idx to 1 (S108), the following processes (S110 to S113) are repeated while incrementing mv_idx by 1 (S115) until it matches the number of candidates NumOfListMv for reference information that can be used for encoding the block blk (S114).

Firstly, reference information corresponding to mv_idx is obtained (S109). In this example, reference information corresponding to mv_idx has already accumulated in a memory cand_mv.

Using this mv and the reference frame ref, a predicted image Pre for block blk is generated (S110).

Specifically, a predicted image is deemed to be image information for an area in reference frame ref, where the area is indicated by mv (vector) from the position of block blk.

The rate-distortion cost "cost" is then calculated by the following formula, using the predicted image Pre that was generated, image information Org of block blk, and pmv, mv, and ref (S111).

$$\text{cost} = D + \lambda \times \{\text{bit}(mv - pmv) + \text{bit}(ref)\} \quad \text{[Formula 1]}$$
$$D = \sum_{pix \in \{pixels\ in\ block\ blk\}} |Org[pix] - Pre[pix]|$$

Here, λ is an undefined Lagrange multiplier, and is a predetermined value. Also, bit( ) expresses a function that returns the amount of code needed to encode applied information.

While D here is a sum of absolute differences of two pieces of image information, it can be a sum of squared differences, or an indicator known as an SATD where the sum is determined after converting the differential information to a frequency band.

A method of accurately determining the rate-distortion cost, albeit one that further increases the arithmetic cost of the encoding process, uses the amount BITS of code when the differential image Diff (=Org−Pre) between an image of the encoding target area and a predicted image is actually encoded, and a decoding differential image DecDiff obtained by decoding encoded data of that differential image, in the formula below.

$$\text{cost} = D + \lambda \times \{\text{bit}(mv - pmv) + \text{bit}(ref) + BITS\} \quad \text{[Formula 2]}$$
$$D = \sum_{pix \in \{pixels\ in\ block\ blk\}} |DecDiff[pix] - Diff[pix]|$$

A comparison is made of the cost and bestCost thus obtained (S112), and, if cost is smaller, bestCost is changed to cost, best_ref is changed to ref, best_mv is changed to mv, and best_pmv is changed to pmv (S113), thereby obtaining information for encoding that ensures the smallest rate-distortion cost.

Subsequently, process in S106 performed by the reference information updater 111 will be explained in detail based on the flowcharts of FIGS. 5 to 12.

In the process of S106, variables FIN, which are allocated to all predicted reference information prediction data accumulated in the predicted reference information prediction data memory 108, are initialized to 0, and the processes of FIG. 5 to FIG. 12 are repeatedly executed until all FIN reach 1.

Figure 5:
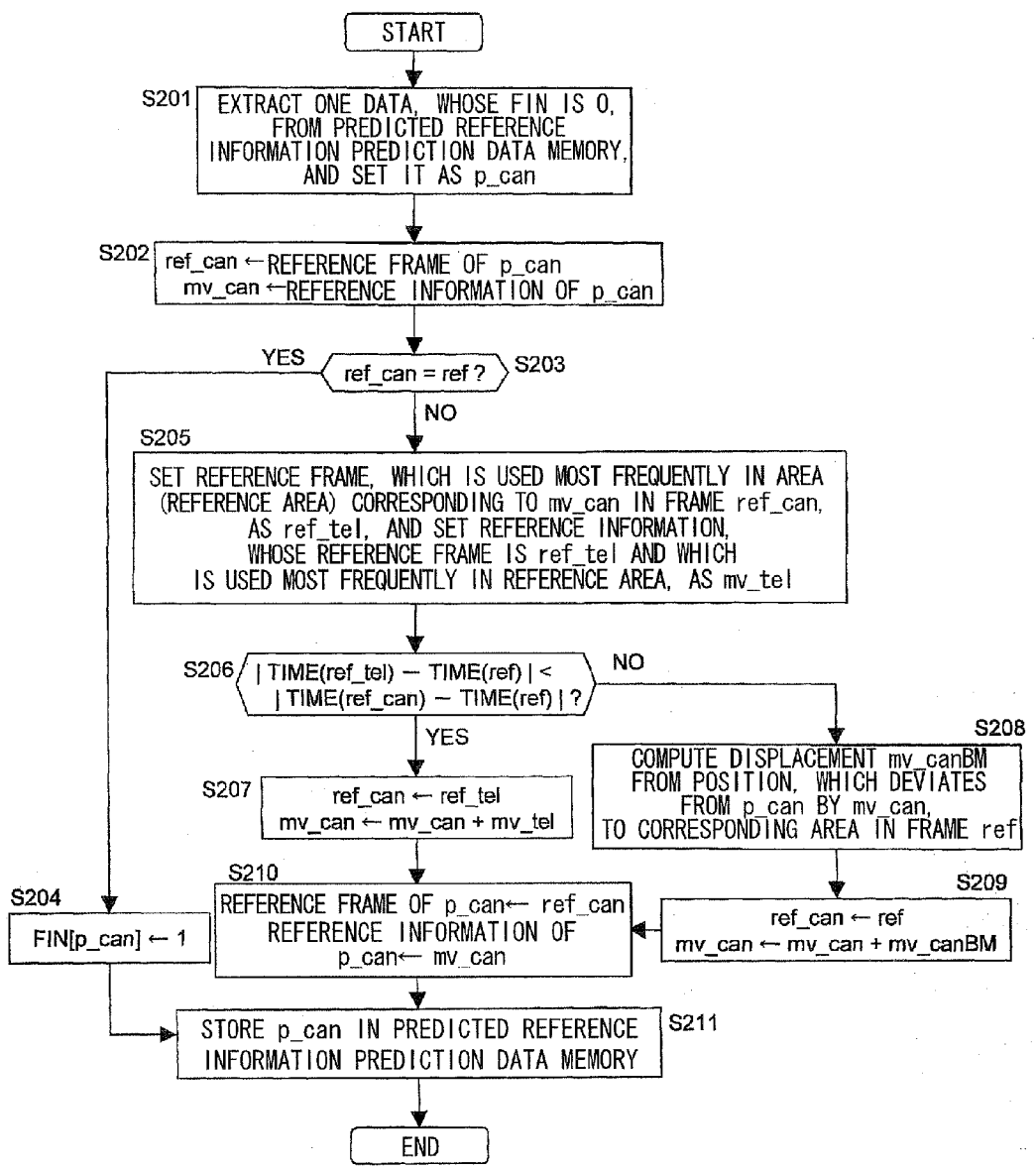
FIG. 5 is an example of the flowchart of the predicted reference information prediction data updating process when only temporal video prediction is possible in the encoding of the present embodiment.

FIG. 5 is a flowchart of a case where all input frames and reference frames are images taken from the same camera.

Figure 6:
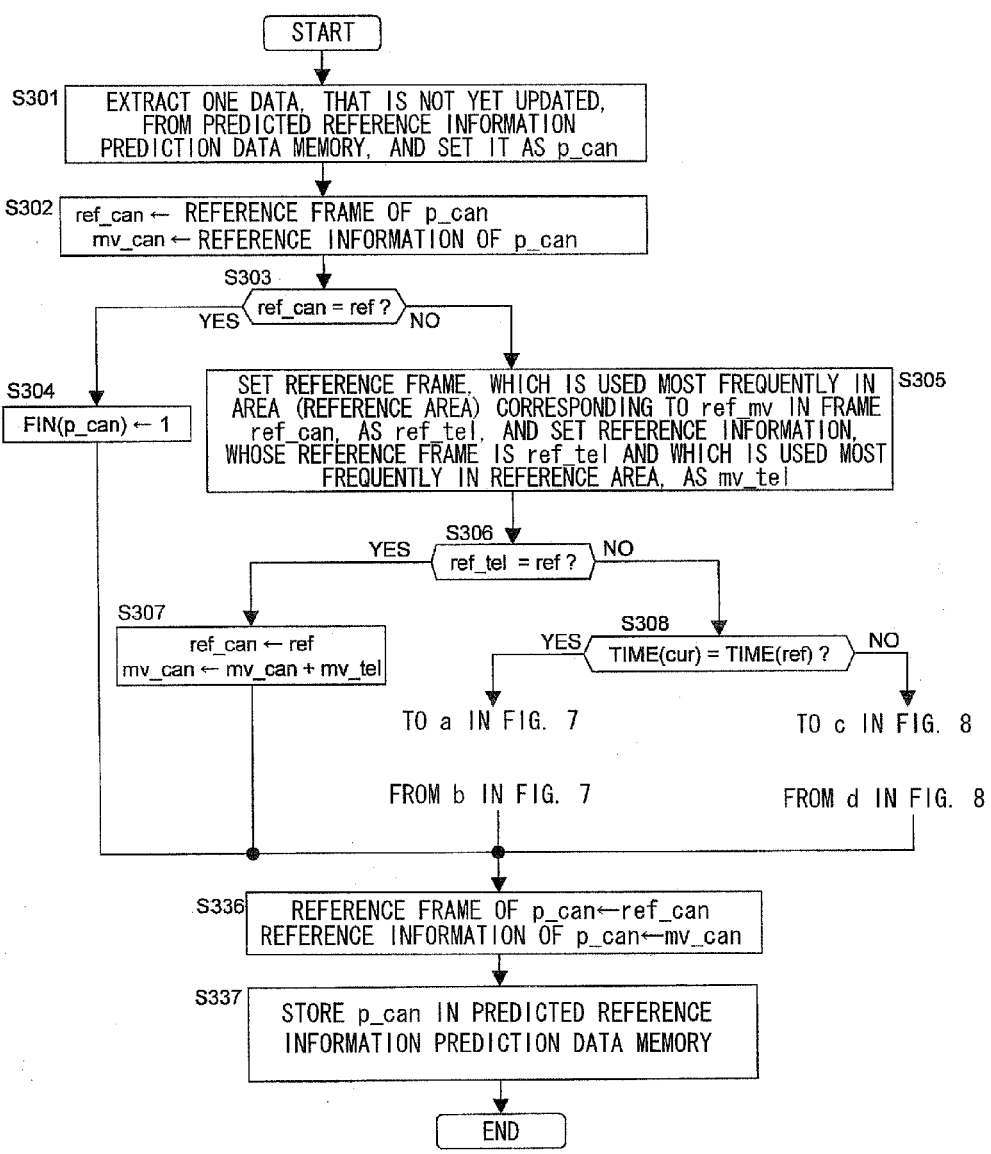
FIG. 6 is an example of the flowchart of the predicted reference information prediction data updating process when any one of temporal video prediction and inter-camera video prediction is possible for each encoding target block in the encoding of the present embodiment.
Figure 7:
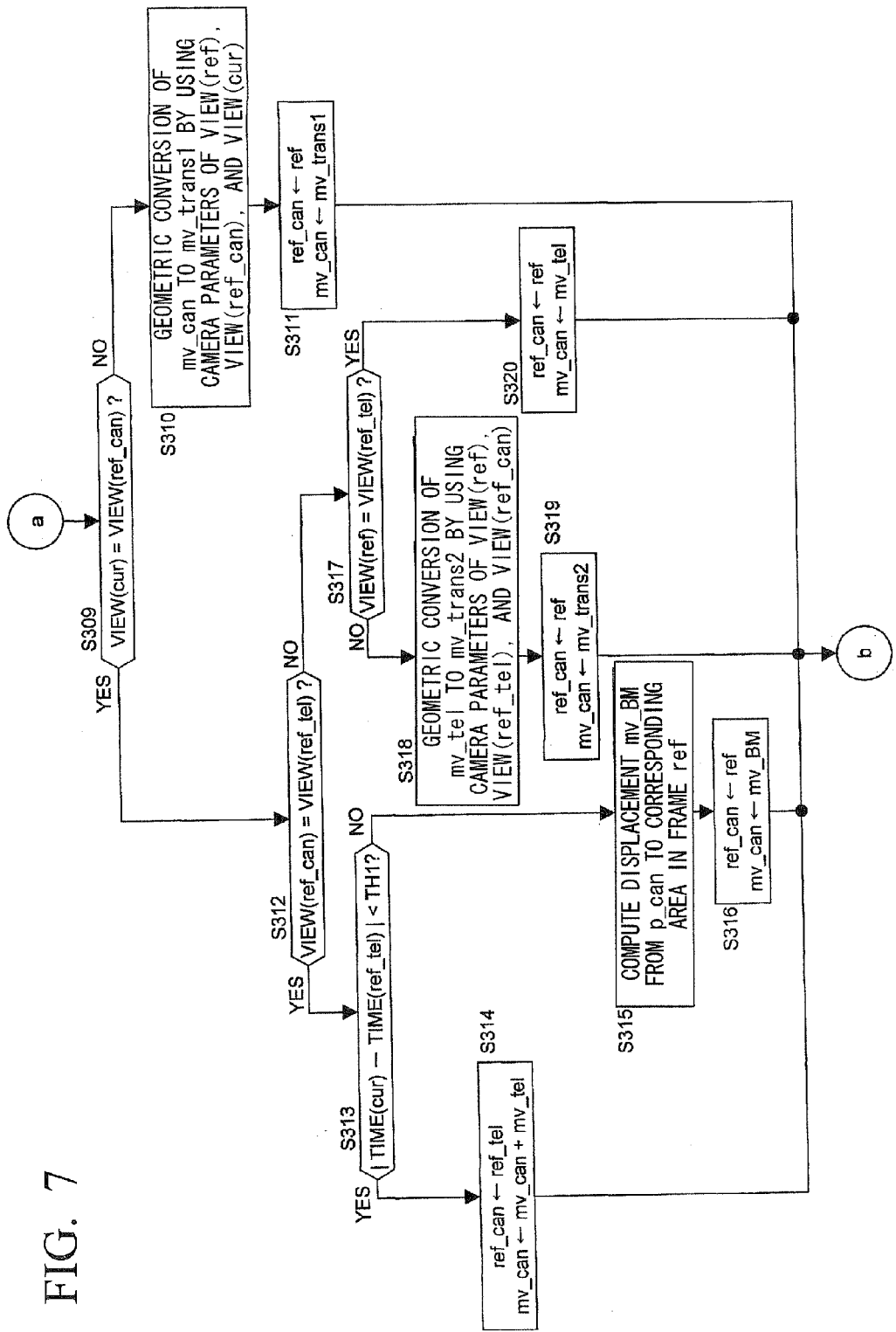
FIG. 7 is an example of the flowchart as a portion of the flowchart of FIG. 6 when the encoding target block is subjected to prediction of inter-camera video change.
Figure 8:
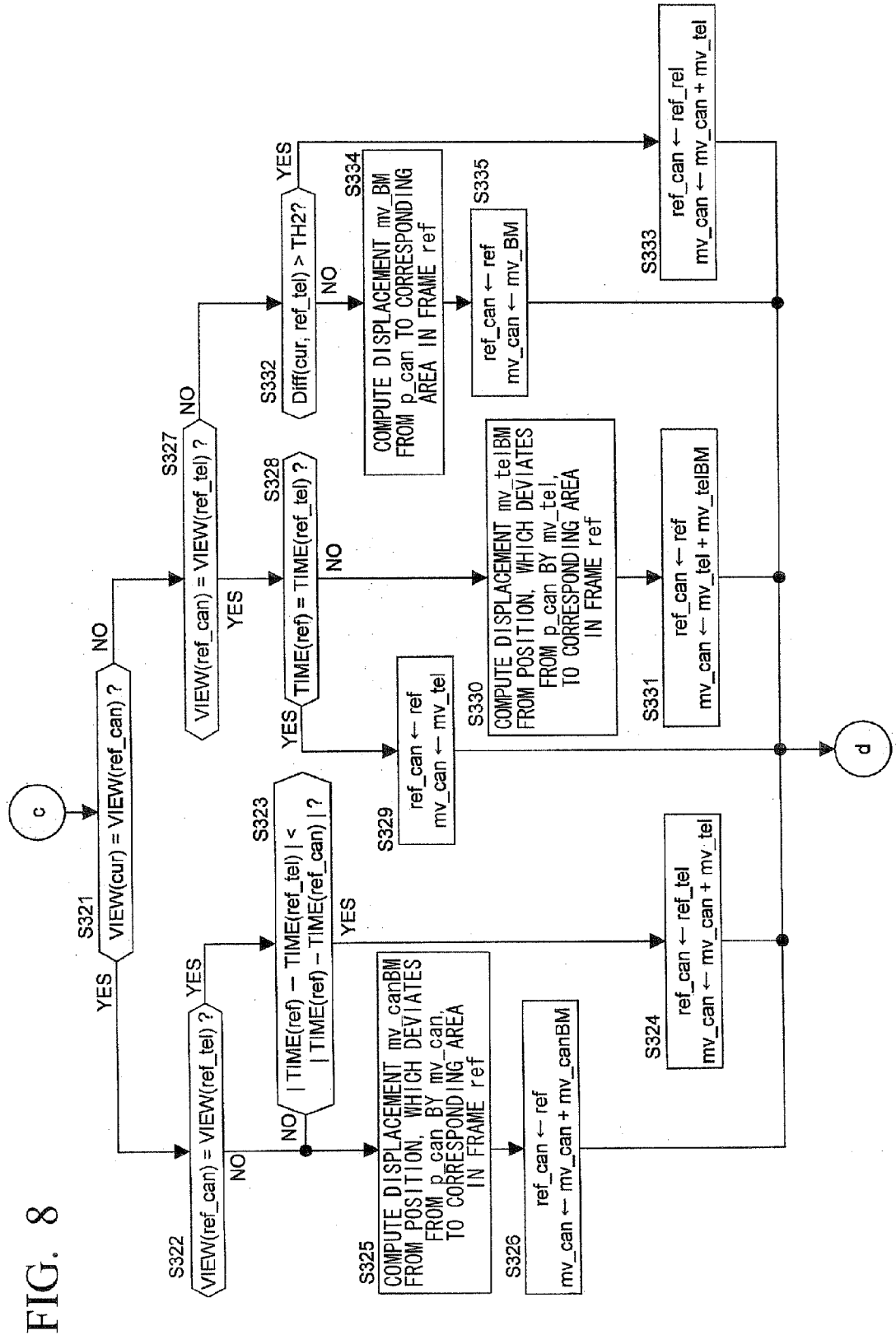
FIG. 8 is an example of the flowchart as a portion of the flowchart of FIG. 6 when the encoding target block is subjected to prediction of temporal video change.
Figure 9:
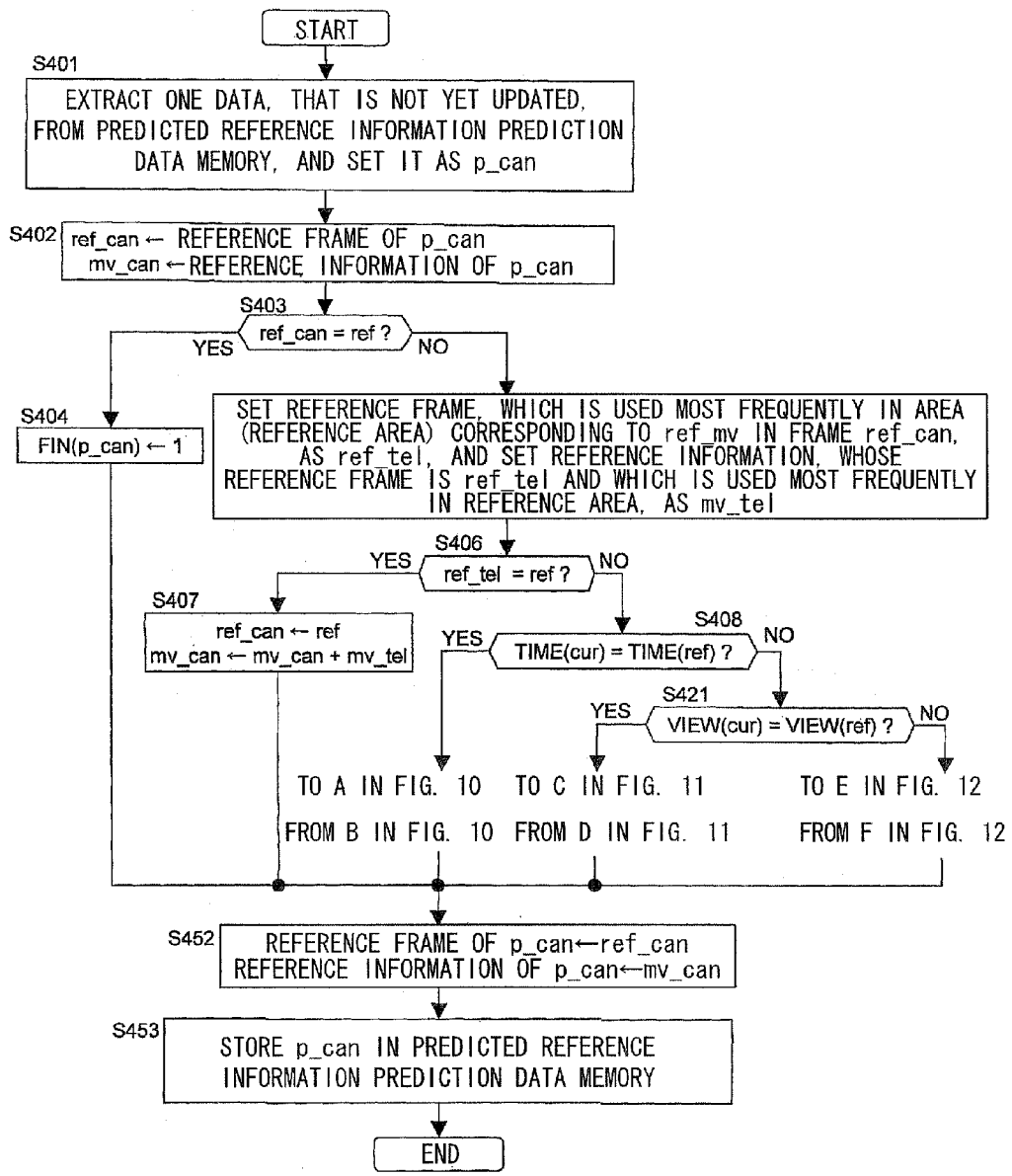
FIG. 9 is an example of the flowchart of the predicted reference information prediction data updating process when any video prediction is possible for each encoding target block in the encoding of the present embodiment.

FIGS. 6 to 8 are flowcharts of a case where a multi-viewpoint image is input, and the reference frame either has the same display time (imaging time) as the input frame or is taken with the same camera.

FIGS. 9 to 12 are flowcharts of a case where a multi-viewpoint image is input, and any frame that has already been encoded can be used as a reference frame.

The flowchart of the case shown in FIG. 5, where all input frames and reference frames are images taken from the same camera, will be explained.

Firstly, predicted reference information prediction data that is not yet updated, i.e. whose FIN is 0, is extracted from the predicted reference information prediction data memory 108 and set as p_can (S201).

As described in the process of S105, since the information in the predicted reference information prediction data memory includes a reference frame used when encoding a plurality of blocks adjacent to the block blk which is the encoding target block, reference information, and information indicating the position of those blocks, p_can is information that includes a reference frame number of the adjacent blocks, reference information of the adjacent blocks, and information indicating the position of the adjacent blocks.

Accordingly, the reference frame number of p_can is set as ref_can, and the reference information of p_can is set as mv_can (S202).

Here, if ref_can is equal to the reference frame number ref of the reference frame to be used in encoding the block blk (S203), the FIN is changed to 1 (S204) and p_can is stored unaltered in the predicted reference information prediction data memory 108 (S211).

That is, when the reference frame ref_can of the relevant adjacent block matches the reference frame ref of the encoding target block, it is better to use the unaltered predicted reference information prediction data extracted from the predicted reference information prediction data memory 108 in generating the predicted reference information pmv; for that reason, p_can is stored unaltered in the predicted reference information prediction data memory 108.

On the other hand, if ref_can is not equal to the reference frame number ref of the reference frame to be used for encoding the block blk, then in the frame ref_can, a reference frame, which is used by most pixels when encoding an area (reference area) obtained by shifting p_can (adjacent area) by mv_can, is set as ref_tel, and reference information whose reference frame is ref_tel and which is used in most pixels in this area is set to mv_tel (S205), whereafter a process is performed based on the following conditional formula.

$$|TIME(ref) - TIME(ref\_tel)| < |TIME(ref) - TIME(ref\_can)| \quad \text{[Formula 3]}$$

Here, TIME ( ) is a function that returns a display time (imaging time) of a frame corresponding to a given reference frame number.

This conditional formula determines whether the reference frame ref_tel is nearer in time to reference frame ref of the encoding target block blk than the reference frame ref_can.

When this conditional formula is satisfied, ref_can is rewritten as ref_tel, and mv_tel is added to mv_can (S207).

When the conditional formula is not satisfied, by using decoded image information of the encoding target frame at the position of p_can, the reference frame ref of the encoding target block blk is used as a search target and the search center is set to mv_can in finding a corresponding area in the reference frame ref, the displacement from the search center (corresponding information) is set to mv_canBM (S208), ref_can is rewritten to ref, and mv_canBM is added to mv_can (S209).

In either case, after ref_can and mv_can are updated, ref_can and mv_can are set as the reference frame number and reference information of p_can (S210), and that p_can is stored in the predicted reference information prediction data memory 108 (S211), whereby the process ends.

While it is assumed here that the flowchart of FIG. 5 is repeatedly executed until the FIN of all predicted reference information prediction data are set to 1, that is, until the reference frame ref of the encoding target block blk is reached, the number of repetitions can be, for example, a stipulated number (once is acceptable).

Furthermore, while in the flowchart of FIG. 5, in the block-matching process of S208, the process searches for an area that matches a reference area for an adjacent area of the encoding target block blk using the reference frame ref of the encoding target block blk as a search target, it is also possible to search for an area that matches an adjacent area of the encoding target block blk.

Furthermore, while in the flowchart of FIG. 5 it is determined whether to execute the process of S207 or the processes of S208 and S209 in compliance with the determination process of S206, the process of S207 can be executed unconditionally.

Thus the reference information updater 111 executes the flowchart of FIG. 5, whereby the predicted reference information prediction data stored in the predicted reference information prediction data memory 108 is updated in the manner shown in FIG. 1.

Subsequently, there will be explained the flowcharts shown in FIGS. 6 to 8, where a multi-viewpoint image is input, and the reference frame either has the same display time (imaging time) as the input frame or is taken with the same camera.

While it is assumed here that the flowcharts of FIGS. 6 to 8 are repeatedly executed until the FIN values for all the predicted reference information prediction data are set to 1, the number of repetitions can be, for example, a stipulated number (once is acceptable).

Firstly, predicted reference information prediction data whose FIN is 0 is extracted and set as p_can (S301). Then, the reference frame number of p_can is set to ref_can, and the reference information of p_can is set to mv_can (S302).

Here, if ref_can is equal to the reference frame number ref of the reference frame to be used in encoding the block blk (S303), FIN is changed to 1 (S304) and p_can is stored unaltered in the predicted reference information prediction data memory 108 (S336 and S337).

Otherwise, a reference frame, which is used by most pixels when encoding an area (reference area) indicated by mv_can of the frame ref-can, is set as ref_tel, and reference information whose reference frame is ref_tel and which is used in most pixels in that area is set to mv_tel (S305), and the following processes (S306 to S335) are performed, whereafter p_can is stored in the predicted reference information prediction data memory 108 (S306 and S337).

In the processes of S306 to S335, if ref_tel is equal to ref (S306), ref_can is rewritten as ref, and mv_tel is added to mv_can (S307).

Otherwise, the display time of an encoding target frame cur is compared with the display time of the reference frame ref of the encoding target block (S308); if they are the same, processes when predicting inter-camera video change with block blk (FIG. 7: S309 to S320) are executed, whereas if they are different, processes when predicting temporal video change in block blk (FIG. 8: S321 to S335) are executed.

In the processes executed when predicting inter-camera video change with block blk (FIG. 7: S309 to S320), it is determined whether the viewpoints (cameras) that took images of frame cur and frame ref_cur are the same (S309).

Here, VIEW ( ) in the flowchart of FIG. 7 is a function that returns an index of a viewpoint (camera) that took the image of a frame corresponding to a given frame number.

When frame cur and frame ref_cur are taken by different cameras (S309), disparity mv_can from an area (adjacent area) at the position of p_can in frame cur to frame ref_can is geometrically converted to disparity mv_trans1 of the adjacent area to frame ref, by using camera parameters of frame cur, frame ref_can, and frame ref (S310), ref_can is rewritten to ref, and mv_can is rewritten to mv_trans1 (S311).

The geometric conversion performed in the process of S310 is executed in the following sequence.

1. Determine central position pos_cur of the area expressed by p_can (area adjacent to encoding or decoding target area);
2. Determine central position pos_can of an area (reference area) that is deviated exactly mv_can from the position expressed by p_can;
3. With x as a variable, determine Trans(cur, ref_can, pos_cur, x) (display this as "~" appended over p (which is a corresponding pixel, explained below)).

Trans(src, dst, pix, d) can be defined by the following formula, and, when d is the distance from a pixel at position pix on an image at viewpoint src to an imaged object, expresses homogeneous coordinates of a corresponding pixel p of a pixel pix on an image at viewpoint dst.

$$A_{dst}R_{dst}^{-1}\{R_{src}A_{src}^{-1}\hat{pix}d + t_{src} - t_{dst}\}$$ [Formula 4]

Here, A, R, and t are camera parameters, respectively representing internal parameters, rotation parameters, and translation parameters. The internal parameters and rotation parameters are 3×3 matrices, while t is a three-dimensional vector.

Coordinates with "~" appended thereto represent homogeneous coordinates. In particular, homogeneous coordinates whose third component is 1 are expressed by appending "^".

While there are various ways of expressing camera parameters, this embodiment uses camera parameters that enable an inter-camera corresponding point to be calculated from the above formula.

4. Determine x that will minimize the Euclidean distance between ^p (the homogeneous coordinate of p whose third component is 1) and pos_can, and call this $d_{cur}$.
5. Determine mv_trans1 in compliance with the following formula.

$$pos_{[<]BEGINITALM}ref = Trans(cur, ref, pos\_cur, d_{cur})$$

$$mv\_trans1 = pos\_ref - pos\_cur$$ [Formula 5]

These formulas describe a case where each piece of positional information is given in two-dimensional coordinates, and the reference information is expressed with a two-dimensional vector.

Figure 13:
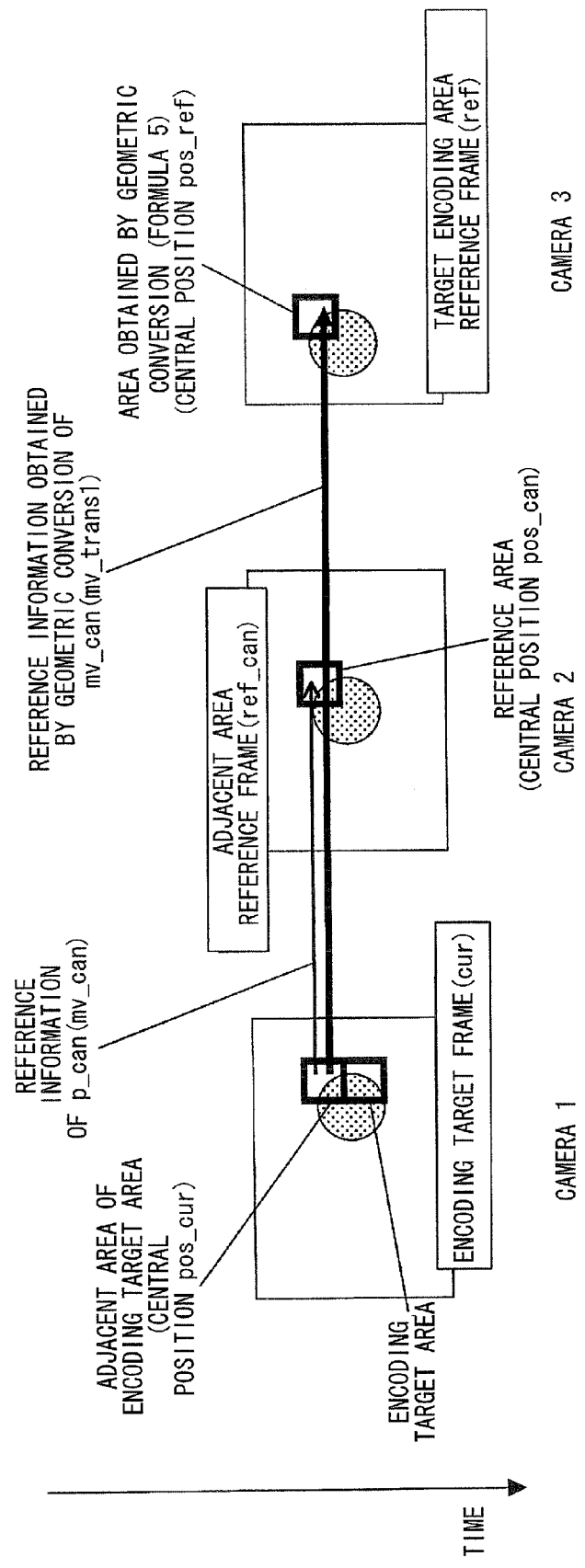
FIG. 13 is a schematic diagram explaining the predicted reference information prediction data updating process executed in S310 of FIG. 7.

FIG. 13 shows an example of a geometric conversion performed in the process of S310. For clarity, mv_can and mv_trans1 are displaced in the vertical direction.

As shown in FIG. 13, in S310, under a condition of "TIME(cur)=TIME(ref)=TIME(ref_can)", mv_can is geometrically converted to mv_trans1, and in S311, mv_can is rewritten as mv_trans1.

On the other hand, when frame cur and frame ref_can are taken by the same camera (YES in S309), it is determined whether frame ref_can and frame ref_tel are taken by the same camera (S312).

If they are taken by the same camera, it is determined whether the time interval between frame ref_cur and frame ref_tel is smaller than a predetermined threshold TH1 (S313).

When this time interval is smaller than the threshold TH1, ref_can is rewritten to ref_tel, and mv_tel is added to mv_can (S314).

On the other hand, when the time interval is equal to or greater than the threshold TH1, a corresponding area in the reference frame ref is determined using the decoded image information of the encoding target frame at the position of p_can, the displacement from the position of p-can (corresponding information) is set as mv_BM (S315), ref_can is rewritten as ref, and mv_can is rewritten as mv_BM (S316).

In the determination process of S312, when it is determined that frame ref_can and frame ref_tel were taken by different cameras, it is determined whether frame ref and frame ref_tel were taken by the same camera (S317).

When they are not taken with the same camera, geometric conversion is performed using camera parameters of VIEW (ref_can), VIEW(ref_tel) and VIEW(ref) (S318) such that disparity mv_tel of an area (reference area) (in an image take with VIEW(ref_can)) at a position, which is obtained when p_can (position of the adjacent block) is deviated by mv_can, to an image take with VIEW(ref_tel) is converted to disparity mv_trans2 of the relevant reference area to the image taken from VIEW(ref), ref_can is rewritten to ref, and mv_can is rewritten as mv_trans2 (S319).

The geometric conversion performed in the process of S318 is executed in the following sequence.

1. Determine central position pos_can of an area at a position that deviates by exactly mv_can from p_can;
2. Determine central position pos_tel of an area at a position that deviates from p_can by exactly mv_can+mv_tel;
3. With x as a variable, determine Trans(ref_can, ref_tel, pos_can, x) (display this as "~" appended over p).
4. Determine x that will minimize the Euclidean distance between p̂ and pos_tel, and call this $d_{can}$.
5. Determine mv_trans2 in compliance with the following formula.

$$pos_{[<]BEGINITALM}ref = Trans(ref\_can, ref, pos\_can, d_{can})$$

$$mv\_trans2 = pos\_ref - pos\_can \quad \text{[Formula 6]}$$

Figure 14:
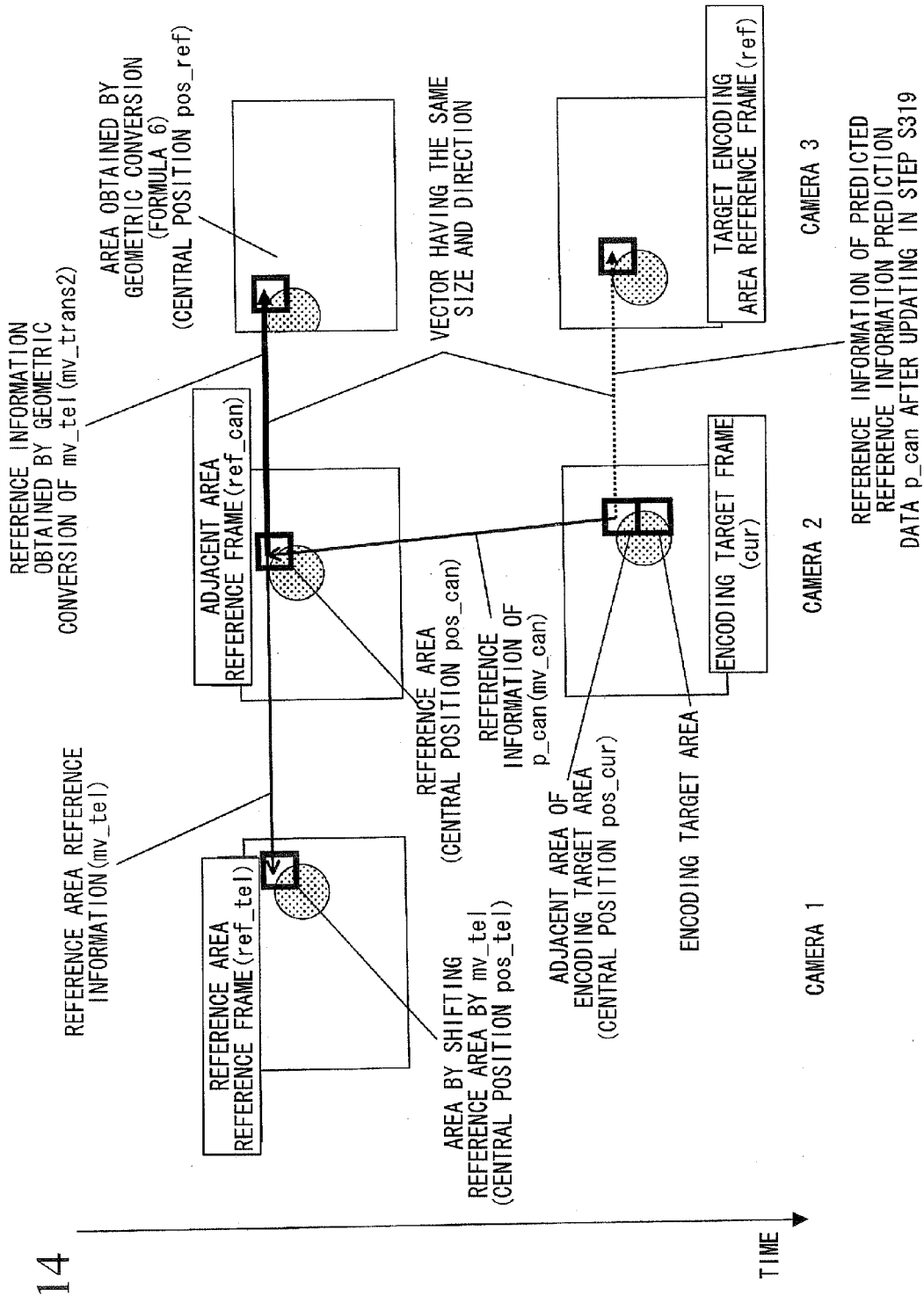
FIG. 14 is a schematic diagram explaining the predicted reference information prediction data updating process executed in S318 of FIG. 7.

FIG. 14 shows an example of a geometric conversion performed in the process of S318.

As shown in FIG. 14, in S318, under conditions of "TIME(cur)=TIME(ref), VIEW(cur)=VIEW(ref_can), TIME(ref_can)=TIME(ref_tel), VIEW(ref)≠VIEW(ref_tel)", mv_tel is geometrically converted to mv_trans2, and in S319, mv_can is rewritten as mv_trans2 (broken line in FIG. 14 represents the process result).

In the determination process of S317, when it is determined that frame ref and frame ref_tel were taken with the same camera, ref_can is rewritten as ref, and mv_can is rewritten as mv_tel (S320).

On the other hand, in the processes of predicting the temporal video change in block blk (FIG. 8: S321 to S335), it is first determined whether frame cur and frame ref_can were taken by the same camera (S321).

When it is determined that they were taken with the same camera, it is determined whether frame ref_can and frame ref_tel were taken with the same camera (S322).

When it is determined that these were also taken with the same camera, it is determined which of them is nearer in time to frame ref (S323).

If it is determined that frame ref_tel is nearer in time to frame ref, ref_can is rewritten to ref_tel, and mv_tel is added to mv_can (S324).

In the determination process of S322, if it is determined that frame ref_can and frame ref_tel are taken with different cameras, or if, in the determination process of S323, it is determined that frame ref_can is nearer in time to frame ref, then by using the decoded image information of the encoding target frame at the p_can position, a corresponding area on the reference frame ref is determined by setting the search center to mv_can, and, with displacement from the search center (corresponding information) set as mv_canBM (S325), ref_can is rewritten as ref, and mv_canBM is added to mv_can (S326).

On the other hand, in the determination process of S321, when it is determined that frame ref_cur and frame ref_can were taken with different cameras, it is determined whether frame ref_can and frame ref_tel were taken with the same camera (S327).

If it is determined that they were taken with the same camera, it is determined whether the display time of frame ref and the display time (imaging time) of frame ref_tel are the same (S328).

When it is determined that they have the same display time, ref_can is rewritten as ref, and mv_can is rewritten as mv_tel (S329).

In the determination process of S328, if it is determined that the display times are different, then by using the decoded image information of the encoding target frame at the p_can position, the search center is set to mv_tel in determining a corresponding area in the reference frame ref, the displacement from the search center (corresponding information) is set to mv_telBM (S330), ref_can is rewritten to ref, and mv_can is rewritten to the sum of mv_tel and mv_telBM (S331).

In the determination process of S327, when it is determined that frame ref_can and frame ref_tel were taken with different cameras, it is determined whether the ratio of matching between the imaged areas of VIEW(cur) and VIEW(ref_tel) is greater than a predetermined threshold TH2 (S332).

In this flowchart, Diff(cam1, cam2) expresses the degree of matching between the imaged areas, and gives the ratio of the area that can be taken by both cameras with respect to an area that can be taken by one camera (which one is determined in advance, and an appropriate threshold TH2 is selected for it). The target from the cameras is restricted to an actual space as far as a separately provided distance. The threshold TH2 is greater than the smallest Diff value in all camera combinations.

In the determination process of S332, when the ratio of matching between the imaged areas of VIEW(cur) and VIEW(ref_tel) is greater than the threshold TH2, ref_can is rewritten to ref_tel, and mv_tel is added to mv_can (S333).

On the other hand, in the determination process of S332, when the ratio of matching between the imaged areas of VIEW(cur) and VIEW(ref_tel) is equal to or lower than the threshold TH2, a corresponding area in the reference frame ref is determined using the decoded image information of the encoding target frame at the p_can position, the displacement from the p_can position (corresponding information) is set as mv_BM (S334), ref_can is rewritten to ref, and mv_can is rewritten to mv_BM (S335).

Subsequently, the flowcharts shown in FIG. 9 to FIG. 12, where a multi-viewpoint image is input and a frame that has already been encoded is used as a reference frame, will be explained.

While it is assumed here that the flowcharts of FIGS. 9 to 12 are repeatedly executed until FIN of all the predicted reference information prediction data are set to 1, the number of repetitions can be, for example, a stipulated number (once is acceptable).

Firstly, predicted reference information prediction data whose FIN is 0 is extracted and set as p_can (S401). The reference frame number of p_can is set to ref_can, and the reference information of p_can is set to mv_can (S402).

Here, if ref_can is equal to the reference frame number ref of the reference frame to be used in encoding the block blk (S403), FIN is changed to 1 (S404) and p_can is stored unaltered in the predicted reference information prediction data memory 108 (S452 and S453).

If not, a reference frame, which is used by most pixels when encoding an area (reference area) in frame ref_can, the are being obtained by shifting p_can (adjacent area) by mv_can, is set as ref_tel, and reference information whose reference frame is ref_tel and which is used in most pixels in that area is set to mv_tel (S405), and the following processes (S406 to S451) are performed, whereafter p_can is stored in the predicted reference information prediction data memory 108 (S452 and S453).

In the processes of S406 to S451, if ref_tel is equal to ref (S406), ref_can is rewritten as ref, and mv_tel is added to mv_can (S407).

Figure 10:
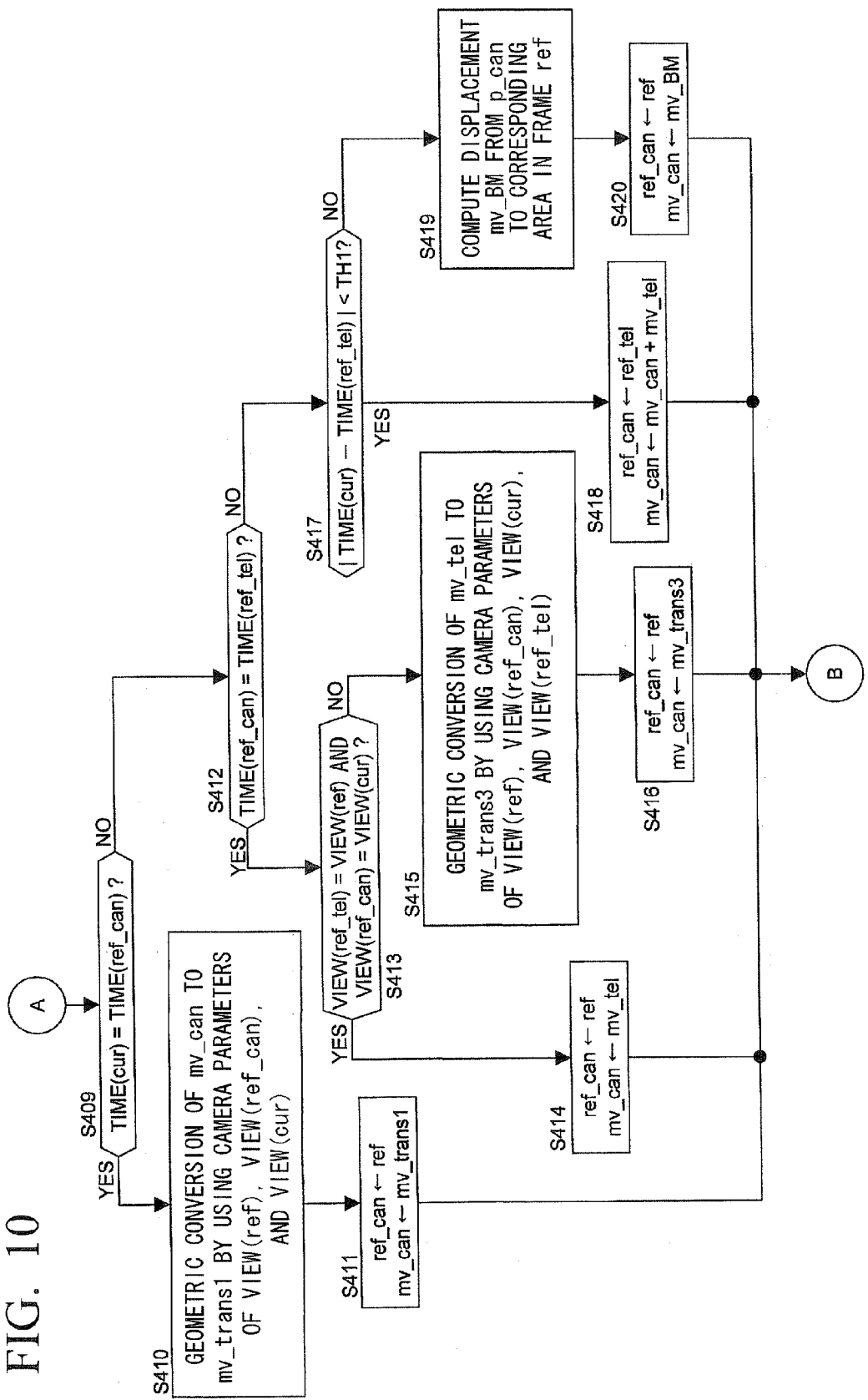
FIG. 10 is an example of the flowchart as a portion of the flowchart of FIG. 9 when the encoding target block is subjected to prediction of inter-camera video change.

If not, the display time of an encoding target frame cur is compared with the display time of the reference frame ref of the encoding target block (S408), and, if they are the same, processes when predicting inter-camera video change in block blk (FIG. 10: S409 to S420) are executed, whereas if they are different, it is determined whether frame cur and frame ref were taken by the same camera (S421).

Figure 11:
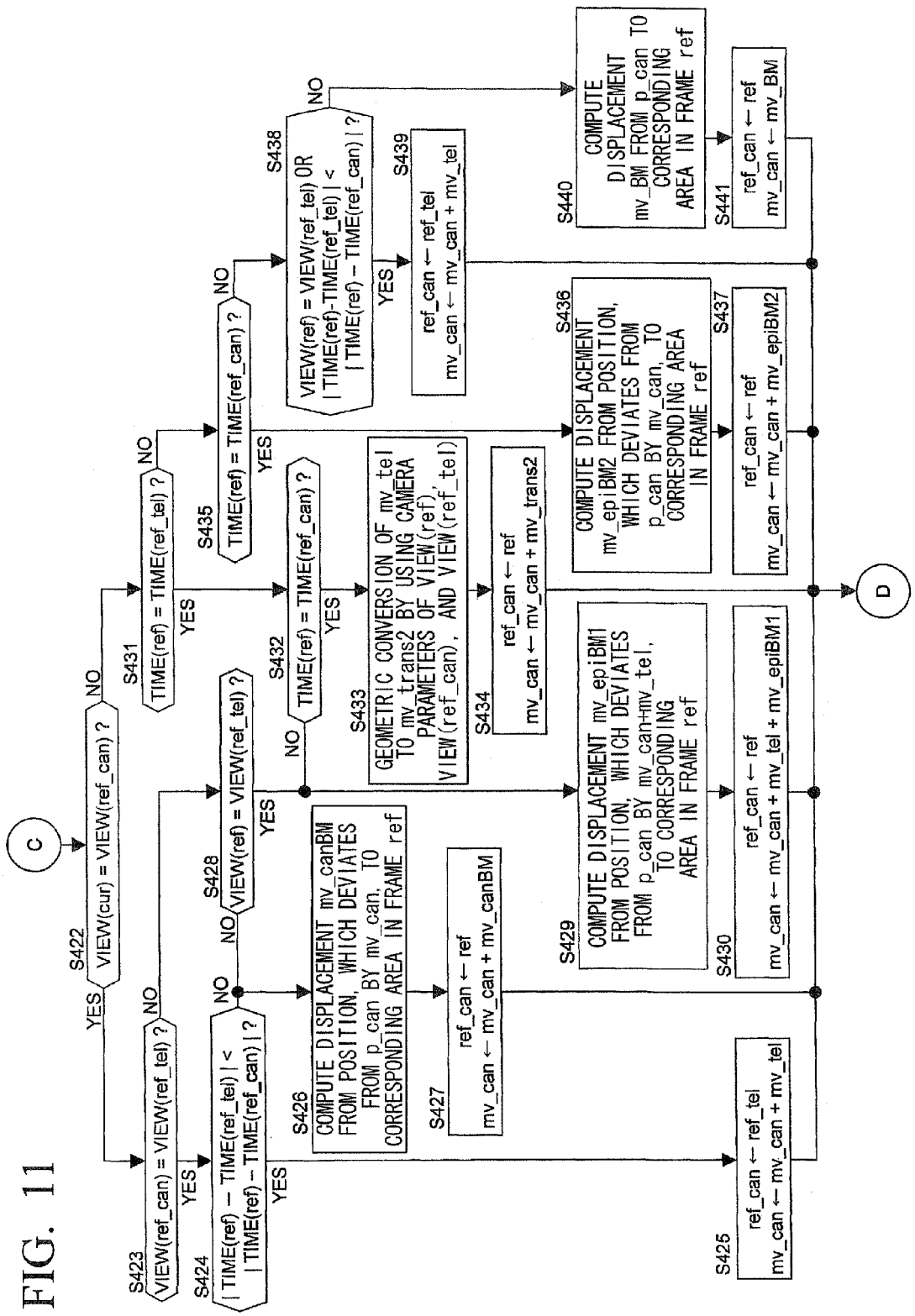
FIG. 11 is an example of the flowchart as a portion of the flowchart of FIG. 9 when the encoding target block is subjected to prediction of temporal video change.

If they are the same, processes when predicting temporal video change in block blk (FIG. 11: S422 to S441) are executed, whereas if they are different, processes when predicting a combination of temporal video change and inter-camera change are executed (FIG. 12: S422 to S451).

In the processes when predicting inter-camera video change in block blk (FIG. 10: S409 to S420), it is firstly determined whether the display time of frame cur is the same as the display time of frame ref_can (S409).

When it is determined that they are the same, employing the same method as in the process of S310, disparity mv_can of an area (adjacent area) at the p_can position in frame cur to frame ref_can is geometrically converted to disparity mv_trans1 of the relevant adjacent area to frame ref, by using camera parameters of frame cur, frame ref_can, and frame ref (S410), ref_can is rewritten to ref, and mv_can is rewritten to mv_trans1 (S411).

The geometric conversion performed in S410 is the same as the one described in S310.

On the other hand, when it is determined in S409 that the display times of frame cur and frame ref_can are different, it is determined whether the display time of frame ref_can is the same as the display time of frame ref_tel (S412).

When it is determined that they are the same, it is determined whether the camera that took frame ref_tel and the camera that took frame ref are the same, and also that the camera that took frame ref_can and the camera that took frame cur are the same (S413).

When it is determined that the two pairs of cameras are the same, ref_can is rewritten as ref, and mv_can is rewritten as mv_tel (S414).

In the determination process of S413, when it is determined that one or both of the two pairs of cameras is/are not the same, geometric conversion is performed using camera parameters of VIEW(cur), VIEW(ref_can), VIEW(ref_tel), and VIEW(ref) (S415) such that disparity mv_tel of an area (reference area) (in the image taken from VIEW(ref_can)) at a position, which is obtained when p_can (position of the adjacent block) is deviated by exactly mv_can, to the image taken from VIEW(ref_tel) is converted to disparity mv_trans3 of an area (adjacent area) at position p_can in the image taken from VIEW(cur) to the image taken from VIEW (ref), ref_can is rewritten to ref, and mv_can is rewritten as mv_trans3 (S416).

The geometric conversion performed in the process of S415 is executed in the following sequence.

1. Determine central position pos_can of an area at a position that deviates by exactly mv_can from p_can;
2. Determine central position pos_tel of an area at a position that deviates from p_can by exactly mv_can+mv_tel;
3. With x as a variable, determine Trans(ref_can, ref_tel, pos_can, x) (display this as "~" appended over p).
4. Determine x that will minimize the Euclidean distance between ~p and pos_tel, and call this $d_{can}$.
5. Determine mv_trans3 in compliance with the following formula.

$$pos_{[<]BEGINITALM}cur2 = Trans(ref\_can, cur, pos\_can, d_{can})$$

$$pos_{[<]BEGINITALM}ref = Trans(ref\_can, ref, pos\_can, d_{can})$$

$$mv\_trans3 = pos\_ref - pos\_cur2 \quad \text{[Formula 7]}$$

Figure 15:
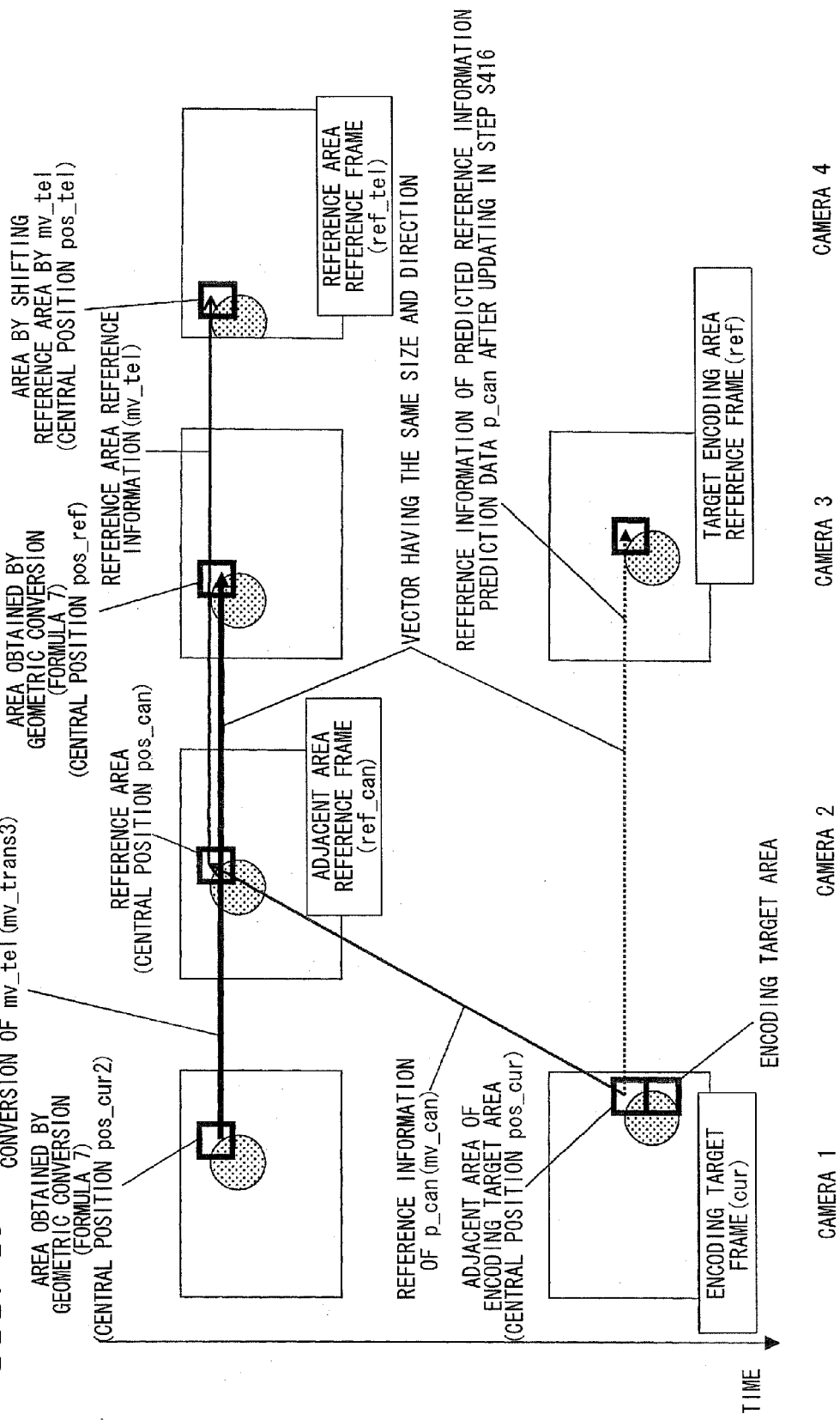
FIG. 15 is a schematic diagram explaining the predicted reference information prediction data updating process executed in S415 of FIG. 10.

FIG. 15 is one example of a geometric conversion performed in the process of S415. For clarity, mv_can and mv_trans3 are displaced in the vertical direction.

As shown in FIG. 15, in S415, under conditions of "TIME (cur)=TIME(ref)≠TIME(ref_can)=TIME(ref_tel)" and "VIEW(ref)≠VIEW(ref_tel) or VIEW(cur)·VIEW (ref_can)", mv_tel is geometrically converted to mv_trans3, and, in S416, mv_can is rewritten as mv_trans3 (the broken line in FIG. 15 represents the processed result).

In the determination process of S412, when it is determined that the display times of frame ref_can and frame ref_tel are different, it is determined whether the time interval between frame cur and frame ref_tel is smaller than a predetermined threshold TH1 (S417).

When this time interval is smaller than the threshold TH1, ref_can is rewritten to ref_tel, and mv_tel is added to mv_can (S418).

When the time interval is equal to or greater than TH1, a corresponding area in the reference frame ref is determined using the decoded image information of the encoding target frame at the p_can position, the displacement from the p-can position (corresponding information) is set as mv_BM (S419), ref_can is rewritten as ref, and mv_can is rewritten as mv_BM (S420).

In the processes performed when predicting temporal video change with block blk (FIG. 11: S422 to S441), it is determined whether the camera that took frame cur is the same as the camera that took frame ref_can (S422).

If they are the same, it is additionally determined whether the camera that took frame ref_can is the same as the camera that took frame ref_tel (S423).

If these are also the same, a determination is made using Formula 3 mentioned earlier (S424).

When Formula 3 is satisfied, ref_can is rewritten as ref_tel, and mv_tel is added to mv_can (S425).

On the other hand, if Formula 3 is not satisfied, then by using decoded image information of the encoding target frame at the position of p_can, the search center is set to mv_can in determining a corresponding area in the reference frame ref, the displacement from the search center (corresponding information) is set to mv_canBM (S426), ref_can is rewritten to ref, and mv_canBM is added to mv_can (S427).

In the determination process of S423, when it is determined that the camera that took frame ref_can and the camera that took frame ref_tel are different, it is then determined whether the camera that took frame ref and the camera that took frame ref_tel are the same (S428).

If they are the same, then by using decoded image information of the encoding target frame at the position of p_can, the search center is set to mv_can+mv_tel in determining a corresponding area in the reference frame ref, the displacement from the search center (corresponding information) is set to mv_epiBM1 (S429), ref_can is rewritten to ref, and mv_tel and mv_epiBM1 are added to mv_can (S430).

In the search of S429, inter-camera restrictions can be used in searching only cases where the center of the corresponding area becomes the perimeter around a straight line obtained by the following sequence.

1. Determine central position pos_tel of an area at a position that deviates by exactly mv_can+mv_tel from p_can;
2. With x as a variable, determine Trans(ref_tel, ref, pos_tel, x) (display this as "~" appended over p).
3. Determine a straight line on frame ref followed by p when x is changed.

While maximum and minimum values of variable x are not determined in this case, they can be set in advance.

In the determination process of S428, when it is determined that the camera that took frame ref and the camera that took frame ref_tel are different, the processes of S426 and S427 are performed.

On the other hand, when it is determined in the first determination of S422 that the camera that took frame cur and the camera that took frame ref_can are different, it is determined whether the display time of frame ref and the display time of frame ref_tel are the same (S431).

If they are the same, it is further determined whether the display time of frame ref and the display time of frame ref_can are the same (S432).

When these are also the same, geometric conversion is performed (S433), employing the same method as in the process of S318, and using camera parameters of VIEW (ref_can), VIEW(ref_tel), and VIEW(ref) such that disparity mv_tel of an area (reference area) (in the image taken from VIEW(ref_tel)) at a position, which is obtained when p_can (position of the adjacent block) is deviated by exactly mv_can, to the image taken from VIEW(ref_tel), is converted to disparity mv_trans2 of the relevant reference area to the image taken from VIEW(ref), ref_can is rewritten to ref, and mv_trans2 is added to mv_can (S434).

Figure 16:
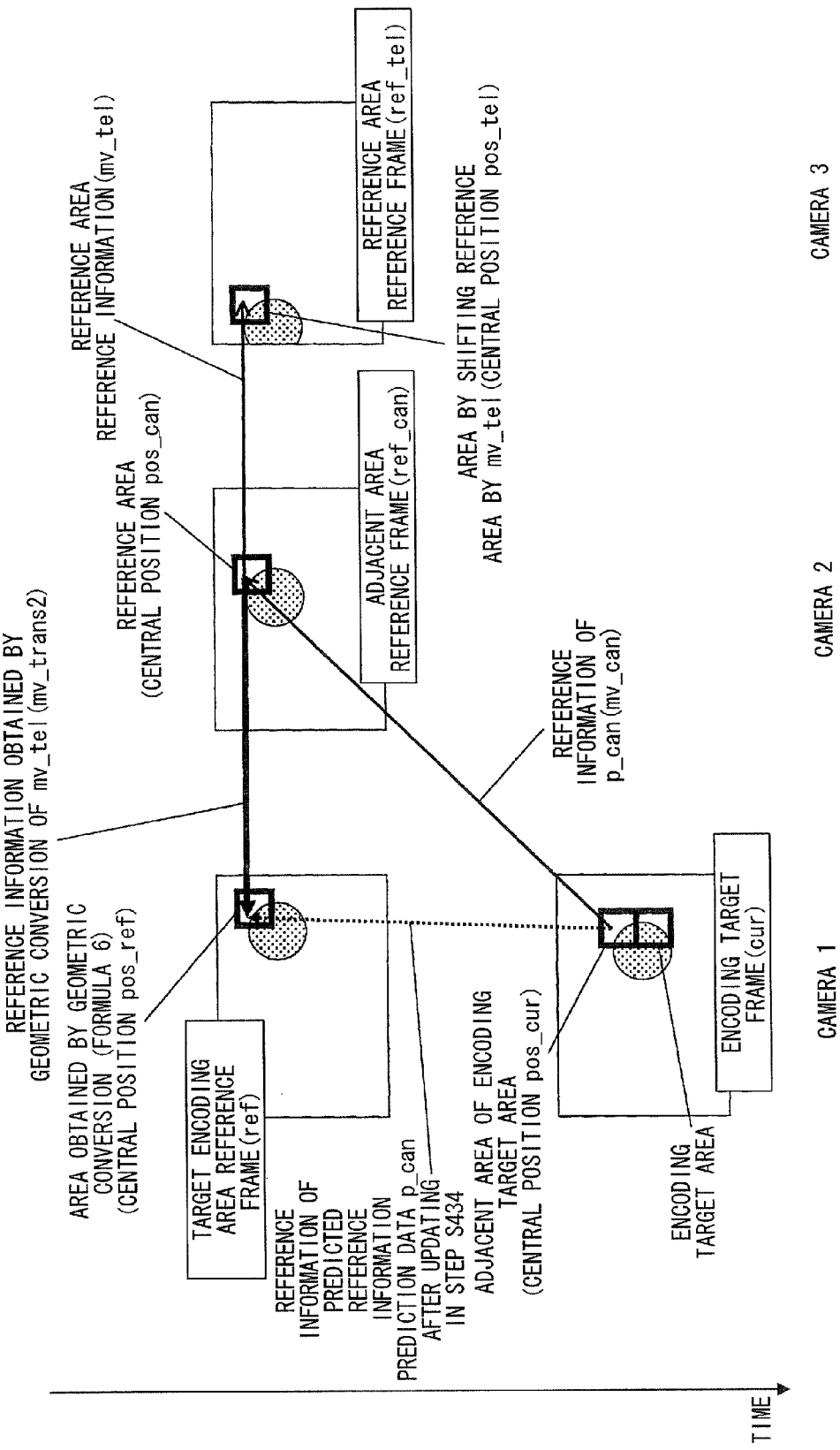
FIG. 16 is a schematic diagram explaining the predicted reference information prediction data updating process executed in S433 of FIG. 11.

FIG. 16 is one example of a geometric conversion performed in the process of S433.

As shown in FIG. 16, in S433, under conditions of "VIEW (cur)=VIEW(ref), VIEW(cur)≠VIEW(ref_can), and TIME (ref)=TIME(ref_can)=TIME(ref_tel)", mv_tel is geometrically converted to mv_trans2, and, in S434, mv_trans2 is added to mv_can (the broken line in FIG. 16 represents the processed result).

In the determination process of S432, when it is determined that the display times of frame ref and frame ref_can are different, the processes of S429 and S430 are performed.

In the determination process of S431, when it is determined that the display times of frame ref and frame ref_tel are different, it is determined whether the display times of frame ref and frame ref_can are the same (S435).

If it is determined that they are the same, then by using decoded image information of the encoding target frame at the position of p_can, the search center is set to mv_can in determining a corresponding area in the reference frame ref, the displacement from the search center (corresponding information) is set to mv_epiBM2 (S436), ref_can is rewritten to ref, and mv_epiBM2 is added to mv_can (S437).

In the search of S436, inter-camera restrictions can be used in searching only cases where the center of the corresponding area becomes the perimeter around a straight line obtained by the following sequence.

1. Determine central position pos_can of an area at a position that deviates by exactly mv_can from p_can;
2. With x as a variable, determine Trans(ref_can, ref, pos_can, x) (display this as "~" appended over p).
3. Determine a straight line on frame ref followed by p when x is changed.

While maximum and minimum values of variable x are not determined here, they can be set in advance.

In the determination process of S435, when it is determined that the display time of frame ref and the display time of frame ref_can are different, a determination is performed according to the two conditional formulas below (S438).

VIEW(ref)=VIEW(ref_tel)

|TIME(ref)−TIME(ref_tel)|<|TIME(ref)−TIME(ref_can)|      [Formula 8]

When either of these formulas is satisfied, ref_can is rewritten as ref_tel, and mv_tel is added to mv_can (S439).

If neither of them is satisfied, then by using decoded image information of the encoding target frame at the p_can position, a corresponding area in reference frame ref is determined, the displacement from p_can (corresponding information) is set as mv_BM (S440), ref_can is rewritten as ref, and mv_can is rewritten as mv_BM (S441).

Figure 12:
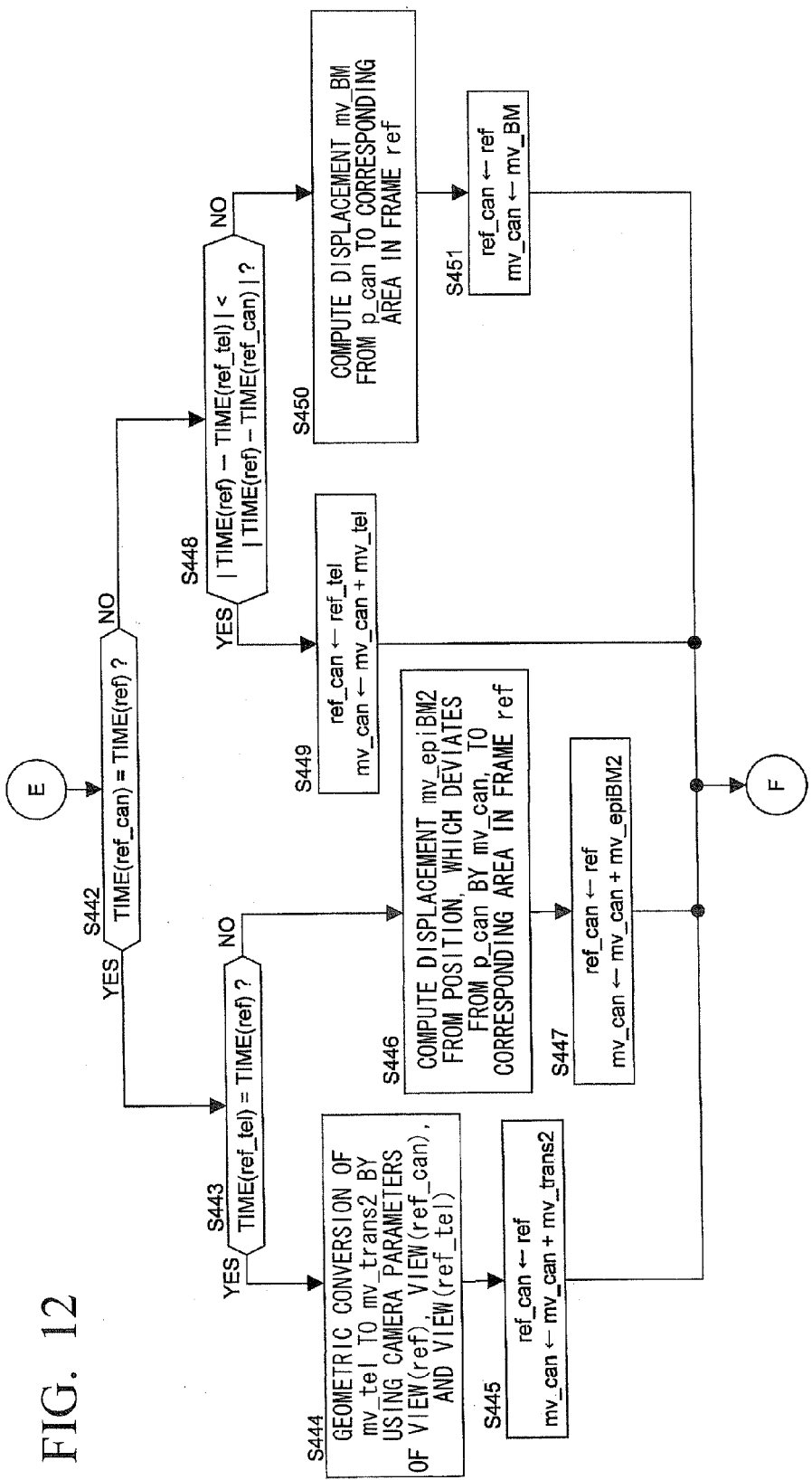
FIG. 12 is an example of the flowchart as a portion of the flowchart of FIG. 9 when the encoding target block is subjected to prediction of video change which includes both temporal video change and inter-camera video change.

In the processes performed when predicting a combination of temporal video change and inter-camera change with block blk (FIG. 12: S442 to S451), it is firstly determined whether the display time of frame ref_can and the display time of frame ref are the same (S422).

When it is determined that they are the same, it is then determined whether the display time of frame ref_tel and the display time of frame ref are the same (S443).

When it is determined that these are also the same, employing the same method as in the process of S318, geometric conversion is performed using camera parameters of VIEW (ref_can), VIEW(ref_tel), and VIEW(ref), such that disparity mv_tel of an area (reference area) (in the image taken from VIEW(ref_can)) at a position, which is obtained when p_can (position of the adjacent block) is deviated by exactly mv_can, to the image taken from VIEW(ref_tel), is converted to disparity mv_trans2 of the reference area to the image taken from VIEW(ref) (S444), ref_can is rewritten to ref, and mv_trans2 is added to mv_can (S445).

Figure 17:
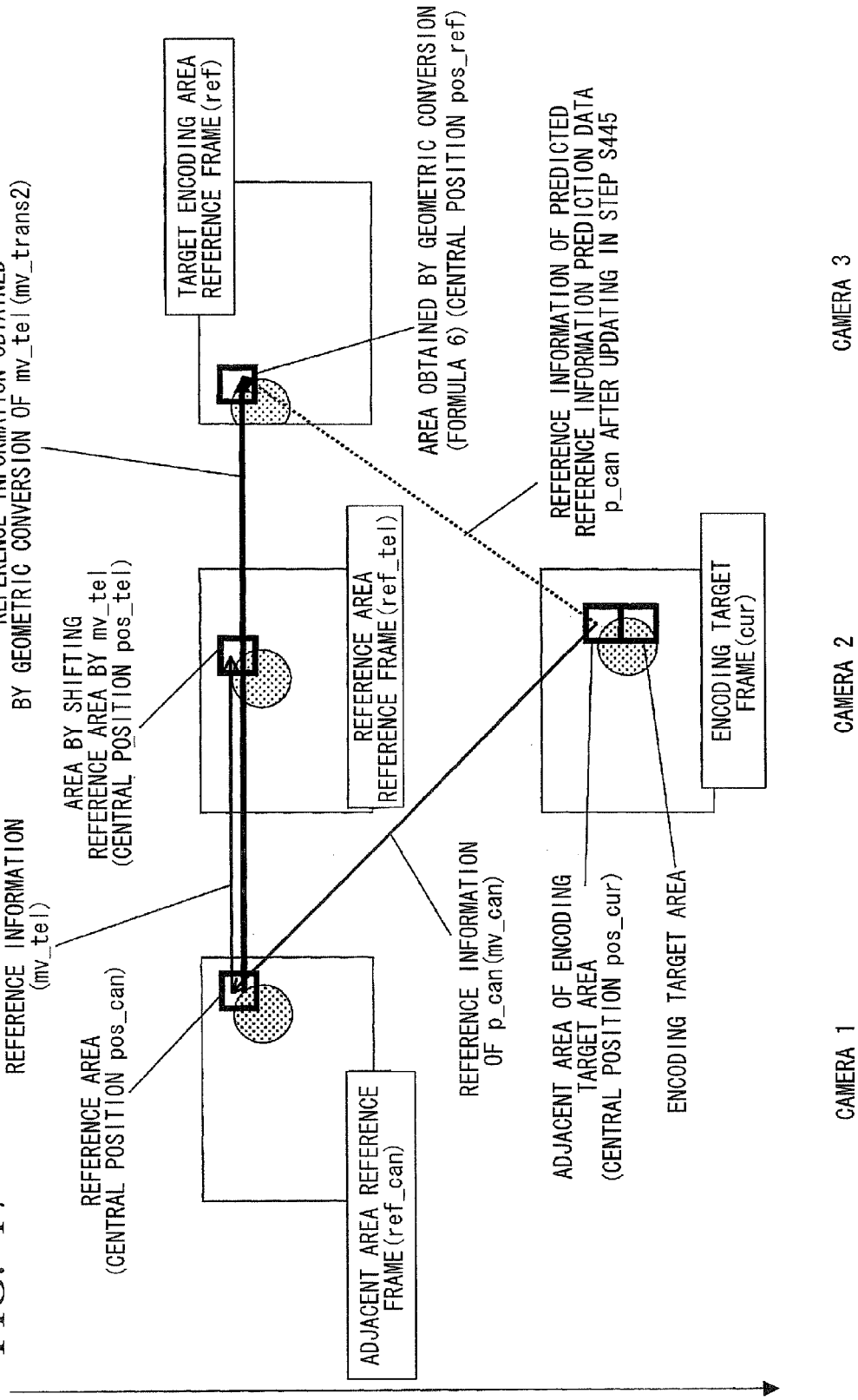
FIG. 17 is a schematic diagram explaining the predicted reference information prediction data updating process executed in S444 of FIG. 12.

FIG. 17 is an example of a geometric conversion performed in the process of S444. For clarity, mv_tel and mv_trans2 are displaced in the vertical direction.

As shown in FIG. 17, in S444, under conditions of "TIME (cur)≠TIME(ref), VIEW(cur)≠VIEW(ref), and TIME(ref)= TIME(ref_can)=TIME(ref_tel)", mv_tel is geometrically converted to mv_trans2, and in S445, mv_trans2 is added to mv_can (the broken line in FIG. 17 represents the process result).

In the determination process of S443, if it is determined that the display time of frame ref_tel and the display time of frame ref are different, then by using decoded image information of the encoding target frame at the position of p_can, the search center is set to mv_can in determining a corresponding area in the reference frame ref, the displacement from the search center (corresponding information) is set to mv_epiBM2 (S446), ref_can is rewritten to ref, and mv_epiBM2 is added to mv_can (S447).

In the search of S446, inter-camera restrictions can be used in searching only cases where the center of the corresponding area becomes the perimeter around a straight line obtained by the same sequence as in the process of S336 described earlier.

On the other hand, when it is determined in the process of S442 performed first that the display time of frame ref_can and the display time of frame ref are different, a determination is made based on Formula 3 (S448).

When Formula 3 is satisfied, ref_can is replaced with ref_tel, and mv_tel is added to mv_can (S449).

When Formula 3 is not satisfied, a corresponding area in the reference frame ref is determined using the decoded image information of the encoding target frame at the position of p_can, the displacement from the p-can position (corresponding information) is set as mv_BM (S450), ref_can is rewritten to ref, and mv_can is rewritten to mv_BM (S451).

Thus by executing the flowcharts of FIGS. 6 to 12, the reference information updater 111 updates the predicted reference information prediction data stored in the predicted reference information prediction data memory 108, as shown in FIGS. 1 and 2.

Subsequently, a video decoding apparatus of the present invention will be explained.

Figure 18:
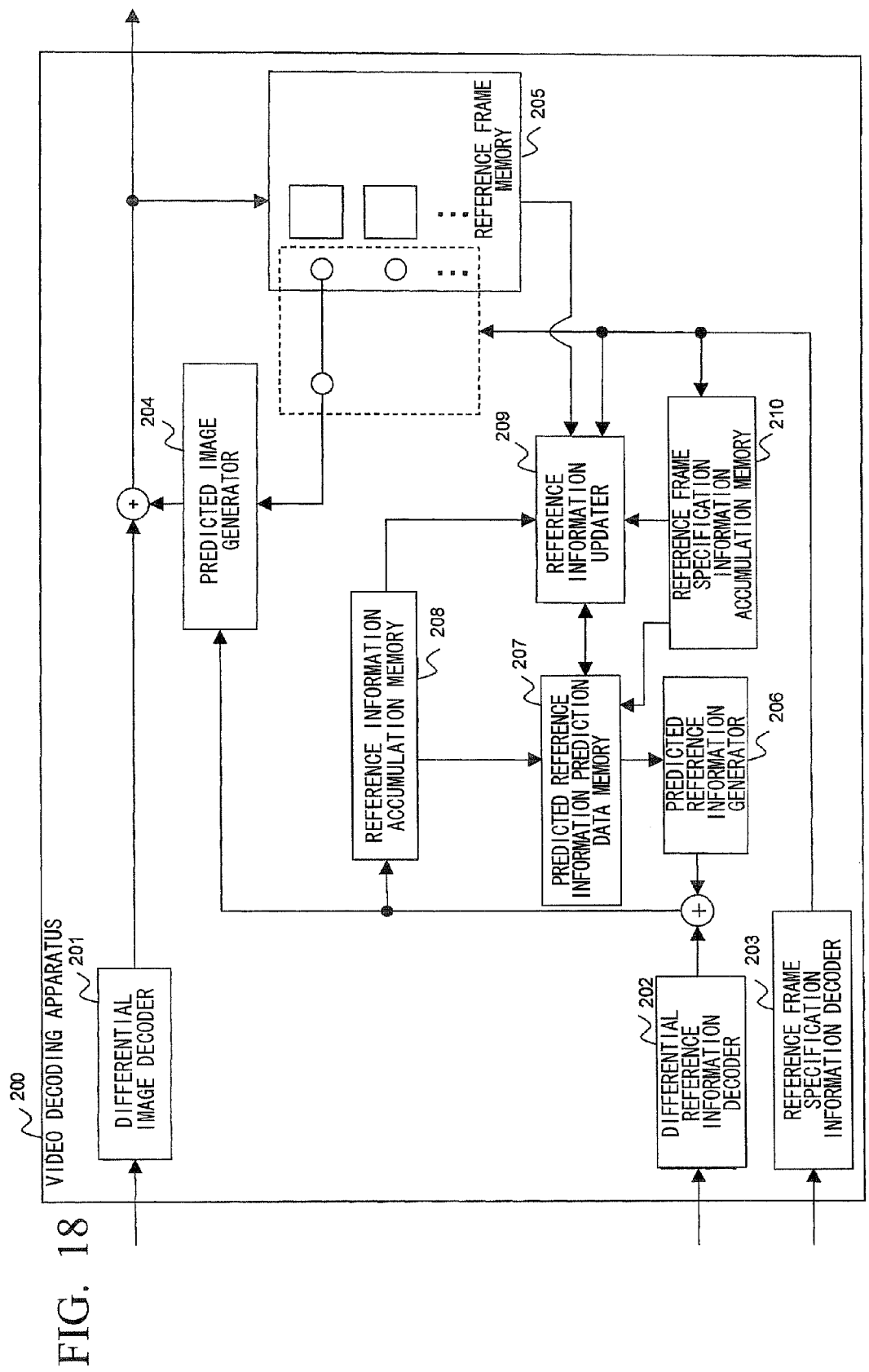
FIG. 18 shows an embodiment of the video decoding apparatus of the present invention.
Figure 20A:
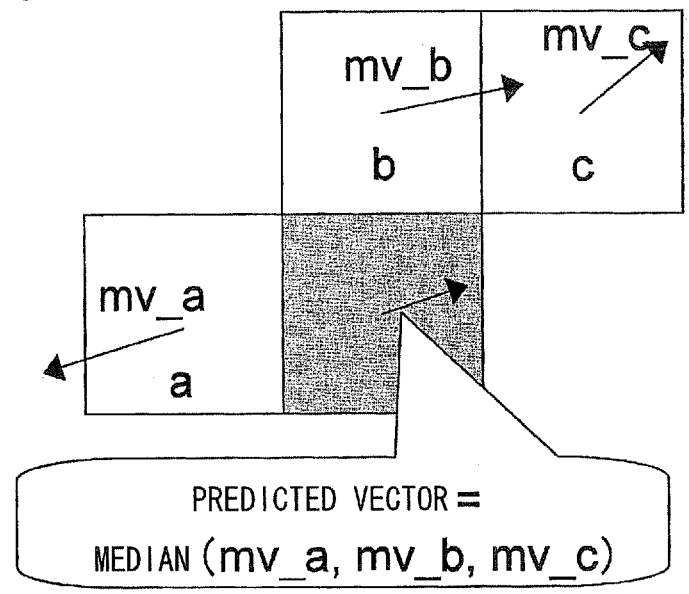
FIG. 20A is a schematic diagram explaining motion vector prediction in H.264.
Figure 20B:
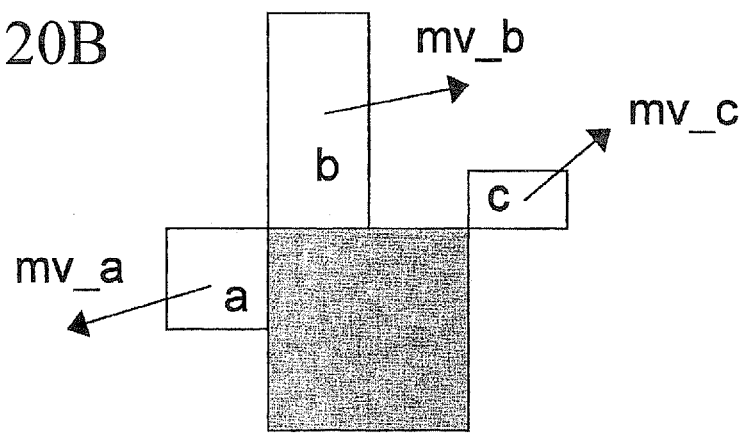
FIG. 20B is also a schematic diagram explaining the motion vector prediction in H.264.
Figure 20C:
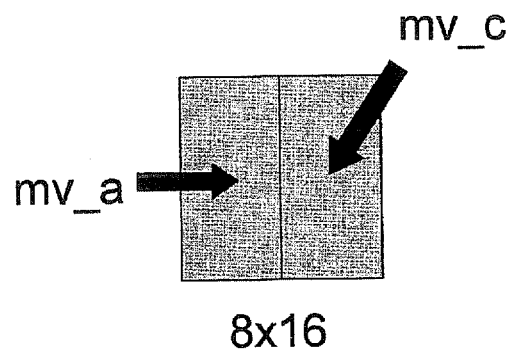
FIG. 20C is also a schematic diagram explaining the motion vector prediction in H.264.
Figure 20D:
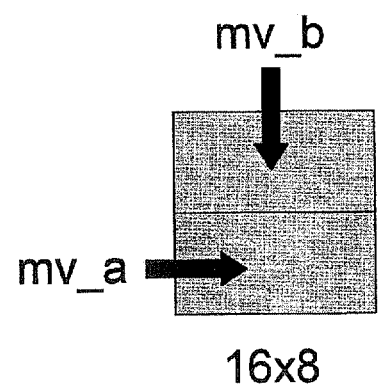
FIG. 20D is also a schematic diagram explaining the motion vector prediction in H.264.
Figure 21:
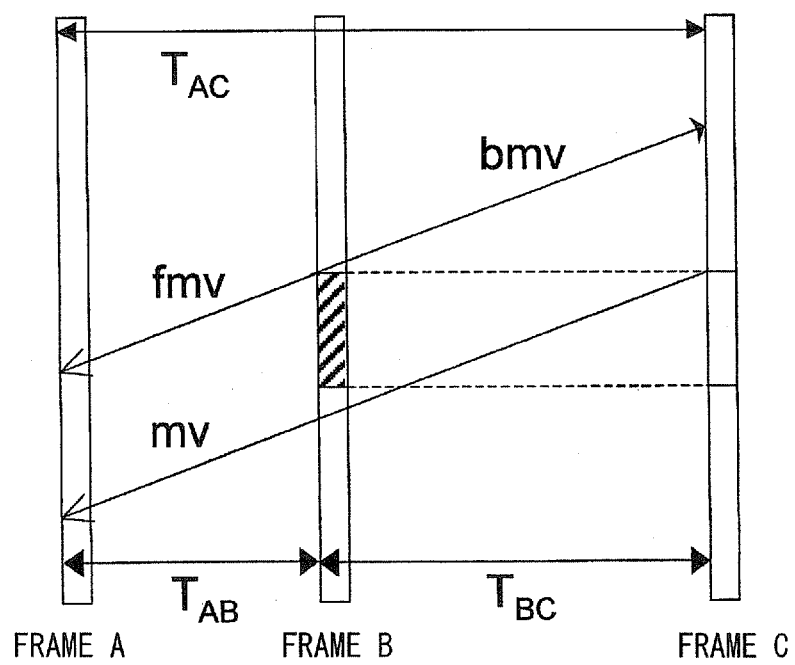
FIG. 21 is a schematic diagram explaining motion vector generation in a direct mode.
Figure 22A:
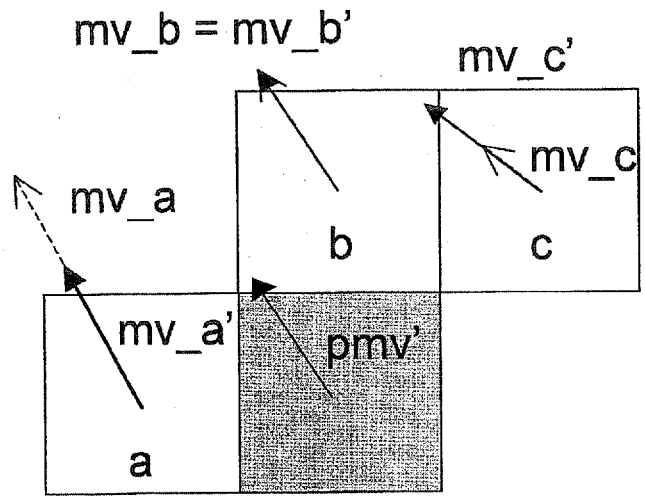
FIG. 22A is a schematic diagram explaining a method of generating a predicted vector by using motion vectors of peripheral blocks around the encoding target block.
Figure 22B:
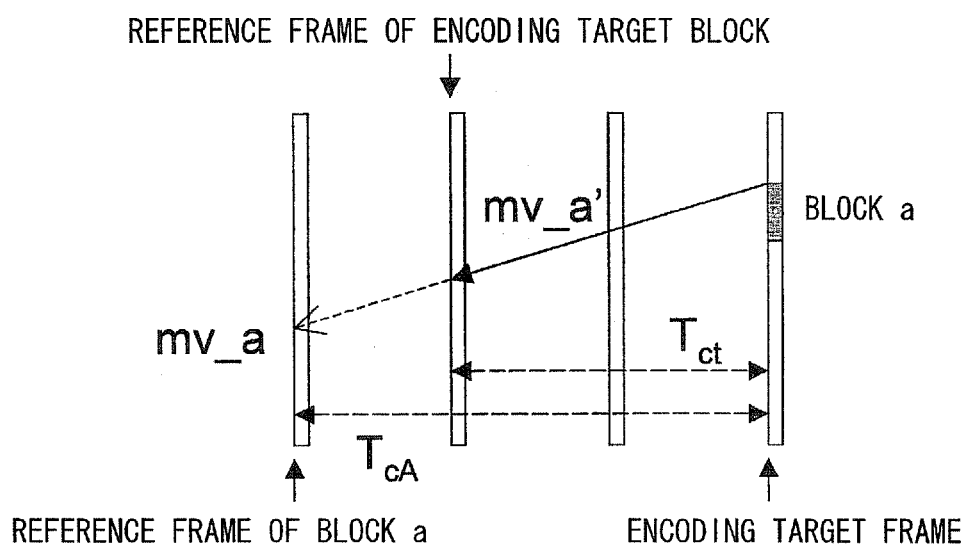
FIG. 22B is a schematic diagram explaining motion vector prediction to which scaling is applied using time information.
Figure 22C:
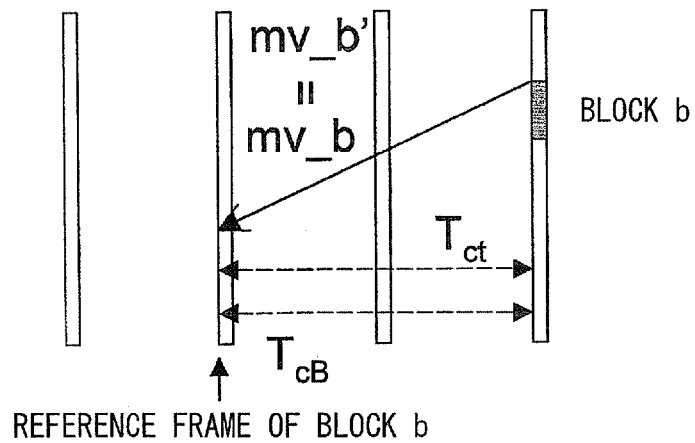
FIG. 22C is also a schematic diagram explaining the motion vector prediction to which scaling is applied using time information.
Figure 22D:
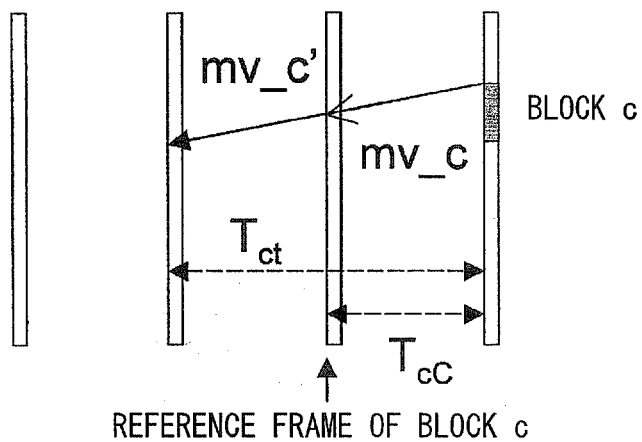
FIG. 22D is also a schematic diagram explaining the motion vector prediction to which scaling is applied using time information.
Figure 23:
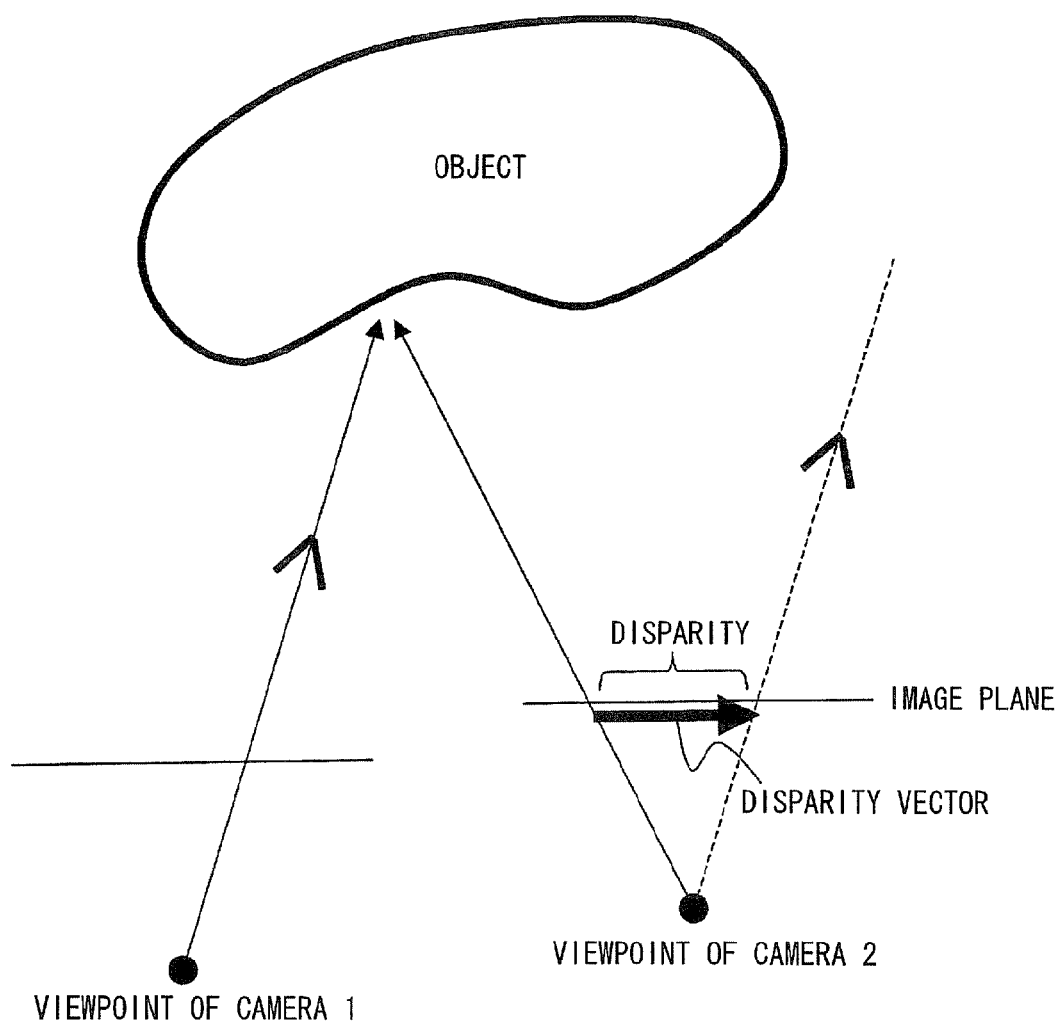
FIG. 23 is a schematic diagram showing disparity generated between cameras.

FIG. 18 is an embodiment of a video decoding apparatus 200 of the present invention.

The video decoding apparatus 200 includes a differential image decoder 201 that decodes encoded data of a differential image with respect to a predicted image of an image that becomes a decoding target, a differential reference information decoder 202 that decodes encoded data of differential reference information with respect to predicted reference information of reference information when generating a predicted image, a reference frame specification information decoder 203 that decodes encoded data of reference frame specification information when generating a predicted image, a predicted image generator 204 that generates a predicted image of a decoding target frame using an already-decoded reference frame, reference frame specification information, and reference information, a reference frame memory 205 that accumulates a decoded image determined from the sum of a predicted image and a decoded differential image, a predicted reference information generator 206 that generates predicted reference information from predicted reference information prediction data (i.e., reference information that becomes a candidate for predicted reference information), a predicted reference information prediction data memory 207 that accumulates predicted reference information prediction data, a reference information accumulation memory 208 that accumulates reference information used in the past when decoding an image, a reference information updater 209 that corrects predicted reference information prediction data in the predicted reference information prediction data memory 207, and a reference frame specification information accumulation memory 210 that accumulates reference frame specification information used in the past when decoding an image.

FIG. 19 is a flowchart executed by the video decoding apparatus 200 having this configuration.

Processes executed by the video decoding apparatus 200 having this configuration will be explained in detail based on the flowchart. It is assumed here that images of a plurality of frames are already decoded, and that the results are accumulated in the reference frame memory 205, the reference information accumulation memory 208, and the reference frame specification information accumulation memory 210.

Firstly, encoded data of a differential image, encoded data of differential reference information, and encoded data of reference frame specification information are input to the video decoding apparatus 200, and sent respectively to the differential image decoder 201, the differential reference information decoder 202, and the reference frame specification information decoder 203 (S501).

The decoding target image is entirely divided into areas, and each area is decoded (S502 to S515). In this flowchart, blk indicates an index of a block (area), and MaxBlk indicates the total number of blocks in one image.

After initializing the index blk at 1 (S502), the following processes (S503 to S513) are repeatedly executed while incrementing blk by 1 (S515) until it reaches MaxBlk (S514).

In a process performed in each block, the encoded data of the reference frame specification information is decoded, the reference frame specification information ref is extracted (S503), and predicted reference information pmv for predicting reference information for a reference frame ref is generated (S504 to S507). Then the encoded data of the differential reference information is decoded, differential reference information mvd is obtained (S508), and reference information my formed from the sum of pmv and mvd is generated (S509).

A predicted image Pre is then generated using the reference frame ref and the reference information my (S510), encoded data of the differential image is decoded to extract a differential image Sub (S511), and a decoded image Dec is generated by calculating the sum of Pre and Sub for each pixel (S512).

The decoded image Dec, the reference information my that was used in decoding the block blk, and the reference frame specification information ref are respectively stored in the reference frame memory 205, the reference information accumulation memory 208, and the reference frame specification information accumulation memory 210 (S513).

For each frame, after the process of decoding all blocks in that frame has ended, and in addition, after all frames whose display time is earlier than that frame have been output, the decoded frame is output from the video decoding apparatus 200.

In the processes of generating the predicted reference information pmv (S504 to S507), after initializing the predicted reference information prediction data memory 207 (S504), with respect to a plurality of blocks adjacent to block blk, a reference frame number REF and reference information MV used when the relevant block was decoded, and information POS indicating the position of that block are stored together in combination (REF, MV, and POS) in the predicted reference information prediction data memory 207 (S505).

At this time, MV and REF are accumulated in the reference information accumulation memory 208 and the reference frame specification information accumulation memory 210 in correspondence with the block index or the position in the image.

When, for example, the areas of the divided image are encoded in a raster scan sequence, the plurality of blocks adjacent to the block blk can include blocks on the upper, left, and upper-right sides.

In this embodiment, reference information of the relevant adjacent blocks is set as predicted reference information prediction data. Off-screen blocks are, however, excluded from the candidates.

Subsequently, the predicted reference information prediction data in the predicted reference information prediction data memory 207 is extracted, updated by the reference information updater 209, and accumulated again in the predicted reference information prediction data memory 207 (S506). This process will be explained in detail later.

Predicted reference information pmv is generated from the plurality of pieces of reference information accumulated in the predicted reference information prediction data memory 207 (S507). Specifically, the predicted reference information pmv is generated by determining an intermediate value of the predicted reference information prediction data for each reference information component.

That is, when the reference information is expressed as a two-dimensional vector along X-Y, for each component, an intermediate value is determined for the corresponding components belonging to a plurality of predicted reference information prediction data, and pmv for the relevant component is given this value.

Incidentally, another reference can be used instead of an intermediate value, such as an average value, maximum value, minimum value, etc. However, the reference used must be the same as that used by the video encoding apparatus.

The process performed by the reference information updater 209 in S506 is similar to the process of S106 shown in FIG. 4 that is performed by the reference information updater 111 in the video encoding apparatus 100.

Firstly, variable FIN allocated to all predicted reference information prediction data accumulated in the predicted reference information prediction data memory 207 are initialized to 0, and the processes in the flowcharts of FIG. 5 to FIG. 12 are repeatedly executed until all FIN reach 1.

FIG. 5 is a flowchart of a case where all input frames and reference frames are images taken from the same camera.

FIGS. 6 to 8 are flowcharts of a case where a multi-viewpoint image is input, and the reference frame either has the same display time (imaging time) as the input frame or is taken with the same camera.

FIGS. 9 to 12 are flowcharts of a case where a multi-viewpoint image is input, and any frame that has already been encoded can be used as a reference frame. For a decoding apparatus, this can be regarded as a flowchart of a case where any frame that has already been decoded can be used as the reference frame.

While the invention has been described according to the embodiments, the invention is not limited to these embodiments.

For example, in the method of generating mv_tel, instead of using a most frequent value as described above, an intermediate value or an average value of each component can be used.

The same method must, however, be used on the video encoding apparatus side and the video decoding apparatus side.

Furthermore, while the embodiments do not mention intraframe encoding, it can easily be added as a method of creating a predicted image by, for example, allocating another number as the reference frame specification information.

Incidentally, when an adjacent block is intraframe-encoded, it can be defined that predicted reference information prediction data is generated with MV (reference information) set at 0, and TIME( ) and VIEW( ) are set to return large absolute values that they definitely do not return in other cases (i.e. when it is not intraframe-encoded). Accordingly, even if the adjacent block is intraframe-encoded, appropriate processing can be performed according to the flowcharts already described. Further, a video encoding apparatus and a video decoding apparatus which do not use reference frame specification information, and are realized by preparing separate encoding modes as in H.264, can easily be inferred from the present invention.

The video encoding and decoding processes as described above can also be implemented by a computer program. Such a computer program may be provided by storing it in an appropriate computer-readable storage medium, or by means of a network.

Although the video encoding and decoding apparatuses have been mainly explained in the above-described embodiments, the video encoding and decoding methods of the present invention can be implemented using the steps corresponding to the operation of each unit included in the video encoding and decoding apparatuses.

While embodiments of the present invention have been described with reference to the drawings, it should be understood that these are exemplary embodiments of the invention and are not to be considered as limiting. Additions, omissions, or substitutions of structural elements, and other modifications for the above-described embodiments can be made without departing from the concept and scope of the present invention.

INDUSTRIAL APPLICABILITY

In accordance with the present invention, reference information, which was used when encoding an area adjacent to the encoding target area, is converted by using encoded data, which was used when encoding the relevant reference area, into reference information suitable for time and viewpoint relationships between the encoding target frame and the encoding target reference frame, and predicted reference information is then generated. Accordingly, even when there is no temporal continuity of video image variation through a plurality of frames or when a multi-viewpoint image is encoded while selecting one of motion compensation and disparity compensation for each encoding unit area, no additional information which indicates the relevant conversion method is added, and difference between the predicted reference information and the reference information used when encoding the encoding target area can be reduced, thereby efficiently encoding a motion vector or disparity information used in interframe prediction encoding.

The invention claimed is:

1. A predicted reference information generating method used when:
   processing a video image by dividing an image into areas; applying a temporal or spatial interframe prediction coding to each area of the divided image; and generating a predicted image of a processing target area based on a reference frame of the processing target area and reference information which is a vector and indicates a predicted target position of the processing target area in the reference frame, and
   generating predicted reference information as predicted information of the relevant reference information, the predicted reference information generating method comprising:
   a predicted reference information prediction data setting step of setting reference information, which was used when processing an area adjacent to the processing target area, as predicted reference information prediction data used for predicting reference information of the processing target area;
   a reference area reference information generating step of generating reference area reference information based on one or more pieces of reference information used when processing a reference area indicated by the predicted reference information prediction data, where the reference area reference information is the reference information used when processing the reference area;

a predicted reference information prediction data updating step of updating the predicted reference information prediction data by using the generated reference area reference information; and a predicted reference information generating step of generating the predicted reference information by using one or more pieces of the updated predicted reference information prediction data, wherein:

in the predicted reference information prediction data updating step, the predicted reference information prediction data is updated by changing the predicted reference information prediction data to the sum of the predicted reference information prediction data and the reference area reference information.

2. A predicted reference information generating method used when:

processing a video image by dividing an image into areas; applying a temporal or spatial interframe prediction coding to each area of the divided image; and generating a predicted image of a processing target area based on a reference frame of the processing target area and reference information which is a vector and indicates a predicted target position of the processing target area in the reference frame, and generating predicted reference information as predicted information of the relevant reference information, the predicted reference information generating method comprising:

a predicted reference information prediction data setting step of setting reference information, which was used when processing an area adjacent to the processing target area, as predicted reference information prediction data used for predicting reference information of the processing target area;

a reference area reference information generating step of generating reference area reference information based on one or more pieces of reference information used when processing a reference area indicated by the predicted reference information prediction data, where the reference area reference information is the reference information used when processing the reference area;

a predicted reference information prediction data updating step of updating the predicted reference information prediction data by using the generated reference area reference information; and a predicted reference information generating step of generating the predicted reference information by using one or more pieces of the updated predicted reference information prediction data, wherein:

in the predicted reference information prediction data updating step, the predicted reference information prediction data is updated by changing the predicted reference information prediction data to the reference area reference information.

3. A predicted reference information generating method used when:

processing a video image by dividing an image into areas; applying a temporal or spatial interframe prediction coding to each area of the divided image; and generating a predicted image of a processing target area based on a reference frame of the processing target area and reference information which is a vector and indicates a predicted target position of the processing target area in the reference frame, and generating predicted reference information as predicted information of the relevant reference information, the predicted reference information generating method comprising:

a predicted reference information prediction data setting step of setting reference information, which was used when processing an area adjacent to the processing target area, as predicted reference information prediction data used for predicting reference information of the processing target area;

a reference area reference information generating step of generating reference area reference information based on one or more pieces of reference information used when processing a reference area indicated by the predicted reference information prediction data, where the reference area reference information is the reference information used when processing the reference area;

a predicted reference information prediction data updating step of updating the predicted reference information prediction data by using the generated reference area reference information; and a predicted reference information generating step of generating the predicted reference information by using one or more pieces of the updated predicted reference information prediction data, wherein:

in the predicted reference information prediction data updating step, the predicted reference information prediction data is updated by changing the predicted reference information prediction data to any one of the sum of the predicted reference information prediction data and the reference area reference information, and the reference area reference information.

4. The predicted reference information generating method in accordance with claim 3, wherein:

in the predicted reference information prediction data updating step, it is determined whether the predicted reference information prediction data is changed to the sum of the predicted reference information prediction data and the reference area reference information when accumulating temporal change between video frames, or to the reference area reference information when converting dimension of inter-camera and time of video change.

5. A predicted reference information generating method used when:

processing a video image by dividing an image into areas; applying a temporal or spatial interframe prediction coding to each area of the divided image; and generating a predicted image of a processing target area based on a reference frame of the processing target area and reference information which is a vector and indicates a predicted target position of the processing target area in the reference frame, and generating predicted reference information as predicted information of the relevant reference information, the predicted reference information generating method comprising:

a predicted reference information prediction data setting step of setting reference information, which was used when processing an area adjacent to the processing target area, as predicted reference information prediction data used for predicting reference information of the processing target area;

a reference area reference information generating step of generating reference area reference information based on one or more pieces of reference information used when processing a reference area indicated by the predicted reference information prediction data, where the reference area reference information is the reference information used when processing the reference area;

a predicted reference information prediction data updating step of updating the predicted reference information prediction data by using the generated reference area reference information;

a predicted reference information generating step of generating the predicted reference information by using one or more pieces of the updated predicted reference information prediction data; and, a predicted reference information geometric-conversion step of applying geometric conversion to the predicted reference information prediction data by using a camera parameter at the viewpoint of a processing target frame, a camera parameter at the viewpoint of the reference frame of the processing target area, and a camera parameter at the viewpoint of a frame indicated by the predicted reference information prediction data.

6. A predicted reference information generating method used when:

processing a video image by dividing an image into areas; applying a temporal or spatial interframe prediction coding to each area of the divided image; and generating a predicted image of a processing target area based on a reference frame of the processing target area and reference information which is a vector and indicates a predicted target position of the processing target area in the reference frame, and generating predicted reference information as predicted information of the relevant reference information, the predicted reference information generating method comprising:

a predicted reference information prediction data setting step of setting reference information, which was used when processing an area adjacent to the processing target area, as predicted reference information prediction data used for predicting reference information of the processing target area;

a reference area reference information generating step of generating reference area reference information based on one or more pieces of reference information used when processing a reference area indicated by the predicted reference information prediction data, where the reference area reference information is the reference information used when processing the reference area;

a predicted reference information prediction data updating step of updating the predicted reference information prediction data by using the generated reference area reference information;

a predicted reference information generating step of generating the predicted reference information by using one or more pieces of the updated predicted reference information prediction data; and, a predicted reference information geometric-conversion step of applying geometric conversion to the reference area reference information by using a camera parameter at the viewpoint of a processing target frame, a camera parameter at the viewpoint of the reference frame of the processing target area, a camera parameter at the viewpoint of a frame indicated by the predicted reference information prediction data, and a camera parameter at the viewpoint of a frame indicated by the reference area reference information corresponding to the predicted reference information prediction data.

7. A video decoding method for decoding an image by entirely dividing an image into areas and generating a predicted image by using a plurality of already-decoded frames, wherein a video image is decoded by decoding, for each area of the divided image, information for indicating a decoding target area reference frame which is an already-decoded frame used for generating the predicted image; reference information for indicating a predicted target position of a decoding target area in the decoding target area reference frame; and differential information between the predicted image and the image of the decoding target area, and the video decoding method comprises:

a predicted reference information prediction data setting step of setting reference information, which was used when decoding an area adjacent to the decoding target area, as predicted reference information prediction data used for predicting reference information of the decoding target area;

a reference area reference information generating step of generating reference area reference information based on one or more pieces of reference information used when decoding a reference area indicated by the predicted reference information prediction data, where the reference area reference information is the reference information used when decoding the reference area;

a predicted reference information prediction data updating step of updating the predicted reference information prediction data by using the generated reference area reference information; and a predicted reference information generating step of generating predicted reference information, which functions as predicted information of the reference information of the decoding target area, by using one or more pieces of the updated predicted reference information prediction data.

8. The video decoding method in accordance with claim 7, wherein:

in the predicted reference information prediction data updating step, the predicted reference information prediction data is updated by changing the predicted reference information prediction data to the sum of the predicted reference information prediction data and the reference area reference information.

9. The video decoding method in accordance with claim 7, wherein:

in the predicted reference information prediction data updating step, the predicted reference information prediction data is updated by changing the predicted reference information prediction data to the reference area reference information.

10. The video decoding method in accordance with claim 7, wherein:

in the predicted reference information prediction data updating step, the predicted reference information prediction data is updated by changing the predicted reference information prediction data to any one of the sum of the predicted reference information prediction data and the reference area reference information, and the reference area reference information.

11. The video decoding method in accordance with claim 10, wherein:

in the predicted reference information prediction data updating step, it is determined whether the predicted reference information prediction data is changed to the sum of the predicted reference information prediction data and the reference area reference information when accumulating temporal change between video frames, or to the reference area reference information, when converting dimension of inter-camera and time of video change.

12. The video decoding method in accordance with claim 7, further comprising:
a predicted reference information geometric-conversion step of applying geometric conversion to the predicted reference information prediction data by using a camera parameter at the viewpoint of a decoding target frame, a camera parameter at the viewpoint of the decoding target area reference frame, and a camera parameter at the viewpoint of a frame indicated by the predicted reference information prediction data.

13. The video decoding method in accordance with claim 7, further comprising:
a predicted reference information geometric-conversion step of applying geometric conversion to the reference area reference information by using a camera parameter at the viewpoint of a decoding target frame, a camera parameter at the viewpoint of the decoding target area reference frame, a camera parameter at the viewpoint of a frame indicated by the predicted reference information prediction data, and a camera parameter at the viewpoint of a frame indicated by the reference area reference information corresponding to the predicted reference information prediction data.

14. A video decoding apparatus having devices for performing the steps in the video decoding method in accordance with claim 7.

15. A non-transitory computer-readable storage medium which stores a video decoding program by which a computer executes the steps in the video decoding method in accordance with claim 7.

* * * * *